(12) United States Patent
Pande et al.

(10) Patent No.: US 10,103,913 B2
(45) Date of Patent: Oct. 16, 2018

(54) SYSTEMS AND METHODS FOR NETWORK ROUTING IN SMALL-WORLD NETWORK-ON-CHIP DEVICES

(71) Applicants: Partha Pande, Pullman, WA (US); Deukhyoun Heo, Pullman, WA (US)

(72) Inventors: Partha Pande, Pullman, WA (US); Deukhyoun Heo, Pullman, WA (US)

(73) Assignee: Washington State University, Pullman, WA (US)

( * ) Notice: Subject to any disclaimer, the term of this patent is extended or adjusted under 35 U.S.C. 154(b) by 112 days.

(21) Appl. No.: 15/081,524

(22) Filed: Mar. 25, 2016

(65) Prior Publication Data

US 2016/0323127 A1    Nov. 3, 2016

Related U.S. Application Data

(60) Provisional application No. 62/138,290, filed on Mar. 25, 2015.

(51) Int. Cl.
*H04L 7/033* (2006.01)
*H04L 27/00* (2006.01)
(Continued)

(52) U.S. Cl.
CPC ........... *H04L 27/0002* (2013.01); *H04B 1/40* (2013.01); *H04L 7/0331* (2013.01); *H04L 7/0337* (2013.01); *H04L 45/12* (2013.01); *H04L 47/30* (2013.01); *H04L 49/109* (2013.01); *H04W 40/02* (2013.01); *H04L 27/04* (2013.01); *H04L 27/06* (2013.01); *H04L 49/60* (2013.01); *H04L 2012/6421* (2013.01); *Y02D 70/00* (2018.01); *Y02D 70/30* (2018.01)

(58) Field of Classification Search
CPC ....... H04L 7/0331; H04L 7/0337; H04L 7/10; H04L 27/06
See application file for complete search history.

(56) References Cited

U.S. PATENT DOCUMENTS 8,391,281 B2* 3/2013 Paul .................. H04L 45/60
                                                        370/359
9,596,295 B2* 3/2017 Banadaki ............ H04L 67/10
(Continued)

OTHER PUBLICATIONS

Deb, S., et al., "Design of an Energy Efficient CMOS Compatible NoC Architecture With Millimeter-Wave Wireless Interconnects," IEEE Transactions on Computers 62(12)2382-2396, Dec. 2013.
(Continued)

*Primary Examiner* — Raj Jain
(74) *Attorney, Agent, or Firm* — Christensen O'Connor Johnson Kindness PLLC

(57) ABSTRACT

In some embodiments, improved routing strategies for small-world network-on-chip (SWNoC) systems are provided. In some embodiments, an ALASH routing strategy or an MROOTS strategy are used in order to improve latency, temperature, and energy use within a network-on-chip system. In some embodiments, millimeter-wave wireless transceivers are used to implement the long-distance links within the small-world network, to create a millimeter-wave small-world network-on-chip (mSWNoC) system. In some embodiments, non-coherent on-off keying (OOK) wireless transceivers are used to implement the wireless links.

7 Claims, 18 Drawing Sheets

(51) Int. Cl.

| | |
|---|---|
| *H04B 1/40* | (2015.01) |
| *H04L 12/933* | (2013.01) |
| *H04W 40/02* | (2009.01) |
| *H04L 12/721* | (2013.01) |
| *H04L 12/835* | (2013.01) |
| *H04L 27/04* | (2006.01) |
| *H04L 27/06* | (2006.01) |
| *H04L 12/931* | (2013.01) |
| *H04L 12/64* | (2006.01) |

(56) References Cited

U.S. PATENT DOCUMENTS

| | | | | |
|---|---|---|---|---|
| 2007/0258507 A1* | 11/2007 | Lee | .................... | H04B 1/71632 375/138 |
| 2008/0292038 A1* | 11/2008 | Ide | ....................... | H04L 7/0337 375/355 |
| 2016/0323127 A1* | 11/2016 | Pande | ................. | H04L 27/0002 |

OTHER PUBLICATIONS

Deb, S., et al., "Enhancing Performance of Network-on-Chip Architectures With Millimeter-Wave Wireless Interconnects," Proceedings of the 21st IEEE International Conference on Application-Specific Systems, Architectures and Processors (ASAP 2010), Rennes, France, Jul. 7-9, 2010, pp. 73-80.

Skeie, T., et al., "Layered Shortest Path (LASH) Routing in Irregular System Area Networks," Proceedings of the International Parallel and Distributed Processing Symposium (IPDPS 2002), Ft. Lauderdale, Fla., Apr. 15-19, 2001, 8 pages.

Wettin, P., et al., "Energy-Efficient Multicore Chip Design Through Cross-Layer Approach," Proceedings of the Design, Automation & Test in Europe Conference & Exhibition, Grenoble, France, Mar. 18-22, 2013, pp. 725-730.

Wettin, P., et al., "Performance Evaluation of Wireless NoCs in Presence of Irregular Network Routing Strategies," Proceedings of the Design, Automation & Test in Europe Conference & Exhibition, Dresden, Germany, Mar. 24-28, 2014, Article No. 272, 6 pages.

Wettin, P., et al., "Performance Evaluation of Wireless NoCs in Presence of Irregular Network Routing Strategies," , Proceedings of the Design, Automation & Test in Europe Conference & Exhibition, Dresden, Germany, Mar. 24-28, 2014, 32-pages presentation copy.

* cited by examiner

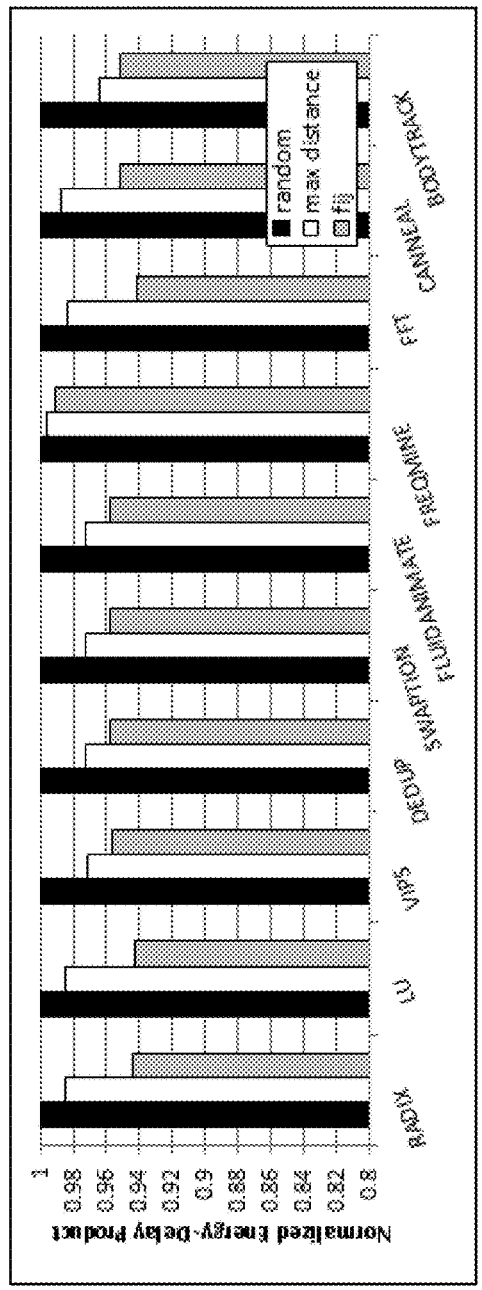
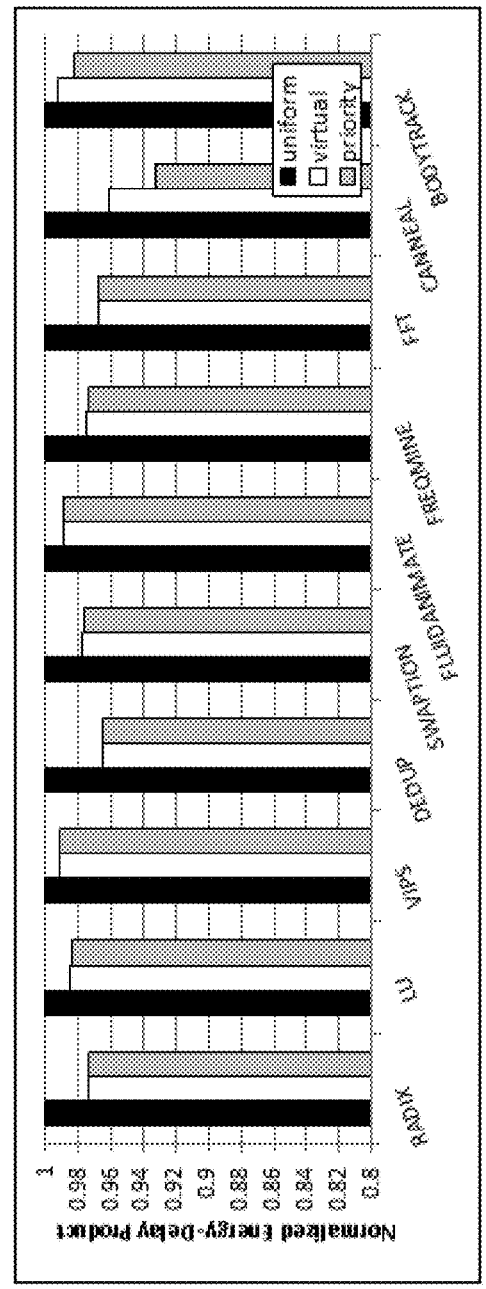
FIG. 8A
FIG. 8B

SYSTEMS AND METHODS FOR NETWORK ROUTING IN SMALL-WORLD NETWORK-ON-CHIP DEVICES

CROSS-REFERENCE TO RELATED APPLICATION

This application claims the benefit of Provisional Application No. 62/138,290, filed Mar. 25, 2015, the entire disclosure of which is incorporated by reference herein for all purposes.

STATEMENT OF GOVERNMENT LICENSE RIGHTS

This invention was made with Government support under Grant No. CCF-0845504, Grant No. CNS-1059289, and Grant No. CCF-1162202 awarded by the US National Science Foundation, and Grant No. W911NF-12-1-0373 awarded by the Army Research Office. The Government has certain rights in the invention.

BACKGROUND

Wireless network-on-chip technology (WiNoC) is envisioned as an enabling technology to design low-power and high-bandwidth, massive multicore architectures. The existing method of implementing a network-on-chip system with planar metal interconnects is deficient due to high latency, significant power consumption, and temperature hotspots arising out of long, multi-hop wireline paths used in data exchange. It is possible to design high-performance, robust, and energy-efficient multicore chips by adopting novel architectures inspired by complex network theory in conjunction with on-chip wireless links.

Using the small-world approach, a highly efficient network-on-chip system with both wired and wireless links can be built. Networks with the small-world property have very short average path lengths, making them particularly interesting for efficient communication with minimal resources. Neighboring cores can be connected through traditional metal wires, while widely separated cores can communicate through long-range, single-hop, wireless links. A small-world network principally has an irregular topology. Routing in irregular networks is complex, because routing methods are typically topology agnostic.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an integrated circuit is provided. The integrated circuit comprises a plurality of processing cores and a plurality of switches connected to the plurality of processing cores. At least two switches of the plurality of switches include non-coherent on-off keying (OOK) wireless transceivers for establishing a wireless communication link between the at least two switches.

In some embodiments, a method of routing information between processing cores of an integrated circuit is provided. A switch of the integrated circuit receives a packet on a virtual layer. The switch evaluates network conditions for a current routing path of the packet. The switch creates a new routing path for the packet and transmits the packet to a first switch in the new routing path in response to determining that the network conditions indicate that the new routing path is preferable to the current routing path. The switch transmits the packet to a next switch in the current routing path for the packet in response to determining that the network conditions indicate that the current routing path is adequate.

In some embodiments, a millimeter-wave small-world wireless network-on-chip system is provided. The system comprises a plurality of processing cores and a network including a plurality of switches. The network communicatively couples the plurality of processing cores to each other. At least two switches of the plurality of switches are communicatively coupled via a wireless interface. Information is routed within the network by receiving, by a switch of the plurality of switches, a packet on a layer; evaluating conditions on the network for a current routing path of the packet; creating a new routing path for the packet and transmitting the packet to a first switch in the new routing path in response to determining that the conditions on the network indicate that the new routing path is preferable to the current routing path; and transmitting the packet to a next switch in the current routing path for the packet in response to determining that the conditions on the network indicate that the current routing path is adequate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 8A and 8B are charts that illustrate variation of the energy-delay product with respect to the location of the roots for MROOTS and the layering function for ALASH for various benchmarks executed by a simulation of an exemplary embodiment of the present disclosure;

DETAILED DESCRIPTION

Many naturally occurring complex networks, such as social networks, the Internet, the brain, as well as microbial colonies exhibit the small-world property. Small-world graphs are characterized by many short-distance links between neighboring nodes as well as a few relatively long-distance, direct shortcuts. Small-world graphs are particularly attractive for constructing scalable WiNoCs because the long-distance shortcuts can be realized using high-bandwidth, low-energy, wireless interconnects while the local links can be designed with traditional metal wires. In some embodiments of the present disclosure, a small-world NoC (SWNoC) architecture is used for a network-on-chip system. In some embodiments of the present disclosure, the long-range shortcuts of a SWNoC are implemented through mm-wave wireless links operating substantially within the 10-100 GHz range to create a millimeter-wave small-world network-on-chip (mSWNoC) system.

Figure 1:
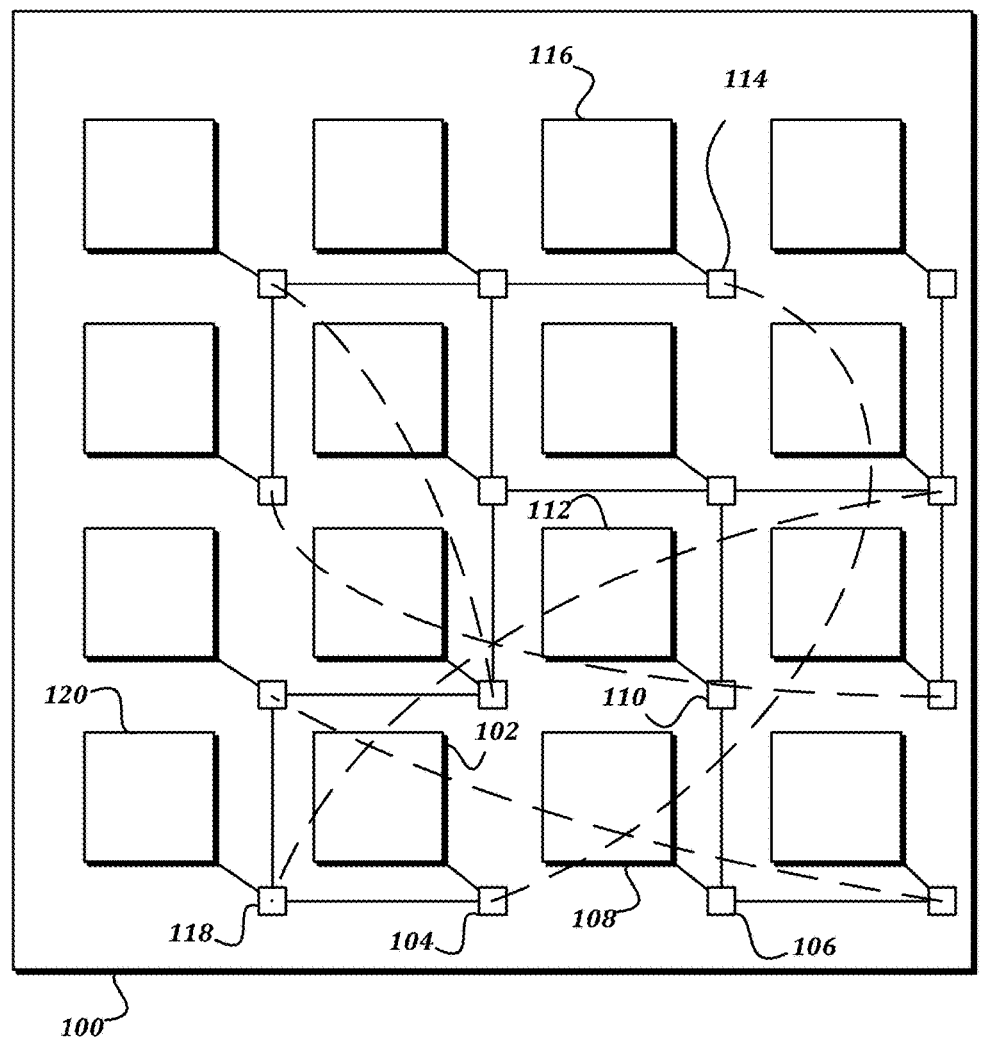
FIG. 1 is a block diagram that illustrates an exemplary embodiment of a small-world network-on-chip system according to various aspects of the present disclosure.

FIG. 1 is a block diagram that illustrates an exemplary embodiment of a small-world network-on-chip system according to various aspects of the present disclosure. The network-on-chip system 100 includes 16 processing cores, including processing cores 120, 102, 108, 112, and 116. Each processing core is associated with a network-on-chip switch. For example, processing cores 120, 102, 108, 112, and 116 are associated with switches 118, 104, 106, 110, and 114, respectively. Each of the switches is communicatively coupled to its associated core via a wireline connection. The illustrated network-on-chip system 100 includes short-range local links between switches, such as the illustrated wires between switch 118 and switch 104, and between switch 110 and switch 1006. The short-range local links are implemented via wireline connections. The illustrated network-on-chip system 100 also includes a lesser number of long-range shortcuts schematically represented by the arching, dashed, interconnects, such as the arc between switch 104 and switch 114. The long-range shortcuts are implemented via wireless connections. The characteristics of the network-on-chip system 100 architecture and the performance and temperature profiles thereof are discussed further below. Although a 16-core network-on-chip system 100 is illustrated for the sake of simplicity, in some embodiments more elements, such as 64 or more processing cores and their associated switches, may be included in the network-on-chip system 100.

In some embodiments, the processing cores are arranged in substantially equal-area tiles over a 20 mm×20 mm die. Each processing core is connected to a switch and the switches are interconnected using both wireline and wireless links. The topology of the network-on-chip system 100 is a small-world network where the links between switches are established following a power-law model. As long wireline interconnects are extremely costly in terms of power and delay, embodiments of the present disclosure use mm-wave wireless links to connect switches that are separated by a long distance. Three non-overlapping wireless channels are used for the mm-wave wireless links. Using these three channels, the wireline small-world connectivity is overlaid with the wireless links such that some of the switches get an additional wireless port. Each of these wireless ports includes wireless interfaces (WIs) tuned to one of the three different frequency channels. Each WI in the network-on-chip system 100 is then assigned one of the three channels; more frequently communicating WIs may be assigned to the same channel to optimize the overall hop-count. In some embodiments, one WI is replaced by a gateway WI that has all three channels assigned to it in order to facilitate data exchange between the non-overlapping wireless channels.

In some embodiments, an average number of connections from each switch to the other switches, $<k>$, may be maintained. In some embodiments, the value of $<k>$ may be chosen to be four so that the network-on-chip system 100 does not introduce any additional switch overhead compared to a conventional mesh. In some embodiments, an upper bound $k_{max}$, is imposed on the number of wireline links attached to a particular switch so that no switch becomes unrealistically large. This also reduces the skew in the distribution of links among the switches. Both $<k>$ and $k_{max}$ do not include the local switch port to the associated processing core.

In some embodiments, the exact topology of the network-on-chip system 100 may be determined using the principles of the small-world graph discussed above. From simulations of performance of a 64-core network-on-chip system, it was determined that the optimum number for $k_{max}$ is 7 as it optimizes both the throughput and energy. This wireline network is then augmented by selecting locations for the wireless interconnects. It has previously been shown that WI placement is most energy efficient when the distance between them is at least 7 mm, for the 65 nm technology node.

Next, the optimum number and placement of WIs may be determined. In some embodiments, a simulated annealing (SA) based methodology may be used to determine the optimum number and placement of WIs, as a SA-based methodology converges to the optimal configuration much faster than an exhaustive search. Initially, the WIs of all frequency ranges are placed randomly, with each switch having equal probability of getting a WI. To perform SA, an optimization metric, β, is established which is closely related to the connectivity and performance of the network. The metric β is proportional to the average distance, measured in hops, between all source and destination switches. In this technique, a single hop is the path length between a source and destination pair that can be traversed in one clock cycle. To compute β the shortest distances between all pairs of switches are computed. The distances are weighted with the normalized frequencies of communication between switch pairs. The optimization metric β can be computed using the following formula:

$$\beta = \Sigma_{\forall i} \Sigma_{\forall j} h_{ij} f_{ij}$$

where $h_{ij}$ is the distance in hops between the $i^{th}$ source and $j^{th}$ destination switches and $f_{ij}$ is the frequency of communication between the $i^{th}$ source and $j^{th}$ destination. This frequency is expressed as the percentage of traffic generated from i that is destined for j. It has been determined via simulations that by increasing the number of WIs, bandwidth increases and energy dissipation decreases. Increasing the number of WIs improves the connectivity of the network as they establish more one-hop shortcuts. However, the wireless medium is shared among all the WIs and hence, as the number of WIs increases beyond a certain limit, performance starts to degrade due to the large token returning period. Moreover, as the number of WIs increases, the overall energy dissipation from the WIs becomes higher, and it causes the packet energy to increase as well. Considering all these factors, it has been determined via simulation that the optimum number of WIs for a 64-core system is 12. In some embodiments, other techniques for determining the topology and/or other values for <k>, $k_{max}$, and the number of WIs may be used.

Figure 2:
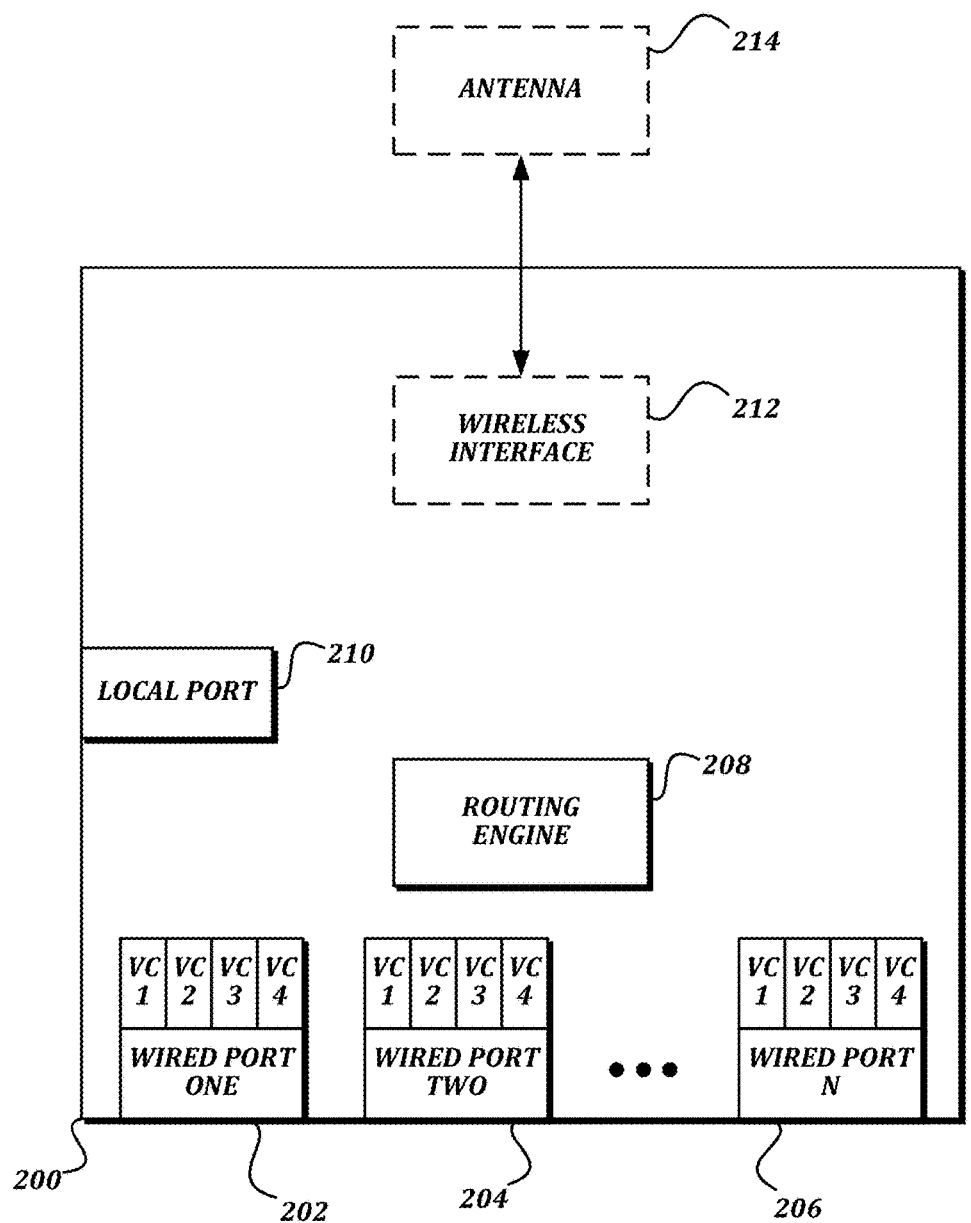
FIG. 2 is a block diagram that illustrates components of an exemplary embodiment of a switch according to various aspects of the present disclosure.

FIG. 2 is a block diagram that illustrates components of an exemplary embodiment of a switch according to various aspects of the present disclosure. As illustrated, the switch 200 includes one or more wired ports 202, 204, 206, a routing engine 208, and a local port 210. The number of wired ports is variable, as discussed above, and the switches 200 in the network-on-chip system 100 have an average number of wired ports of <k> and a maximum number of wired ports of $k_{max}$. Each of the wired ports 202, 204, 206 includes a set of virtual channels VC1, VC2, VC3, VC4 to provide flit-based, wormhole routing between switches. In the routing mechanisms discussed below, these virtual channels are each assigned to a virtual layer. The local port 210 provides a wireline connection to an associated processing core. In some embodiments, the routing engine 208 is implemented in a hard-wired digital circuit, and provides the logic for implementing the routing functionality as described below, including storing routing path information in look-up tables, analyzing network conditions, and the like. As illustrated, the switch 200 also includes an optional wireless interface 212 and an optional antenna 214, which are included if the switch has been chosen to include a wireless interface as discussed above.

Figure 3:
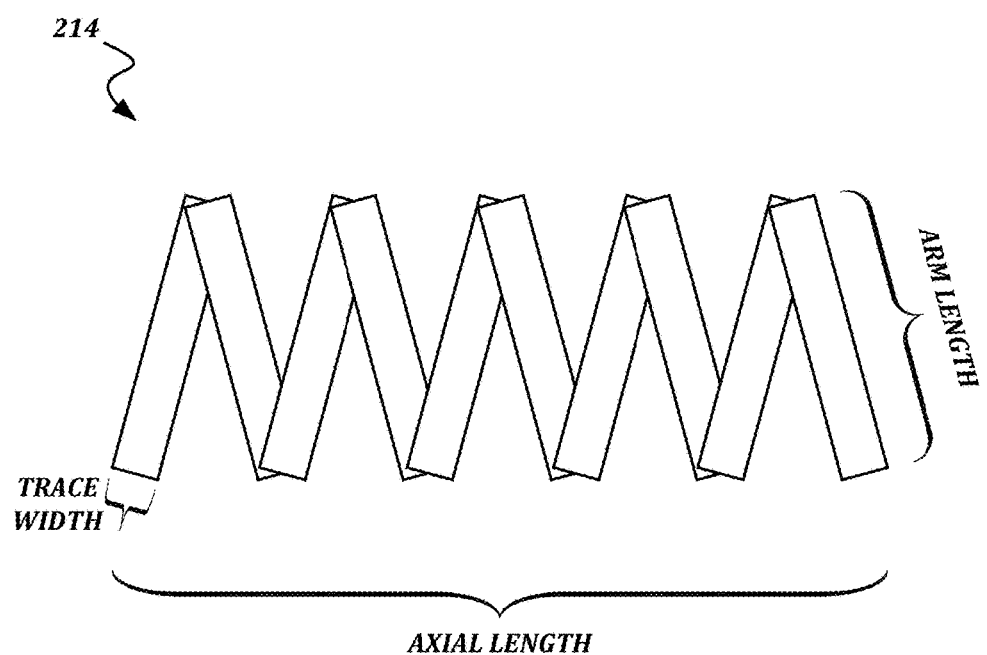
FIG. 3 illustrates an exemplary embodiment of an antenna according to various aspects of the present disclosure.

FIG. 3 illustrates an exemplary embodiment of an antenna according to various aspects of the present disclosure. The on-chip antenna for the network-on-chip system 100 preferably provides the best power gain for the smallest area overhead. A metal zigzag antenna has been demonstrated to possess these characteristics. This antenna also has negligible effect of rotation (relative angle between transmitting and receiving antennas) on received signal strength, making it most suitable for mm-wave network-on-chip applications. Zigzag antenna characteristics depend on physical parameters like axial length, trace width, arm length, bend angle, etc. By varying these parameters, the antennas are designed to operate on different frequency channels. In some embodiments of the present disclosure, three different channels were used with 3 dB bandwidths of 16 GHz, and center frequencies of 31 GHz, 57.5 GHz, and 120 GHz respectively with a communication range of 20 mm. In some embodiments, the zigzag antennas designed for this purpose use a 10 μm trace width, a 60 μm arm length, and a 30° bend angle. For optimum power efficiency, the quarter wave antennas may use axial lengths of 0.73 mm, 0.38 mm, and 0.18 mm, respectively. The antenna design ensures that signals outside the communication bandwidth, for each channel, are sufficiently attenuated to avoid inter-channel interference.

Figure 4:
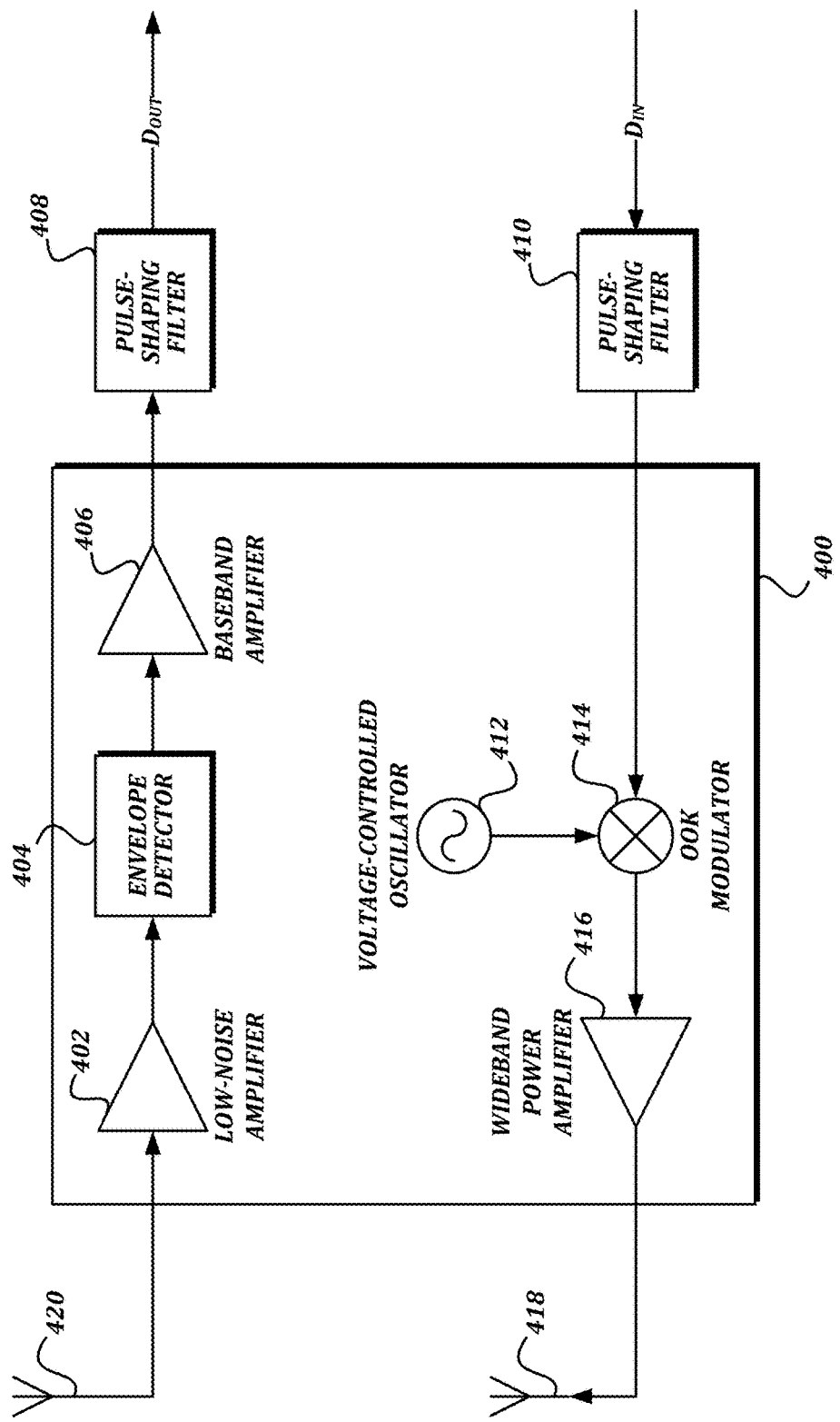
FIG. 4 is a block diagram that illustrates an exemplary embodiment of a non-coherent OOK wireless transceiver according to various aspects of the present disclosure.
Figure 5A:
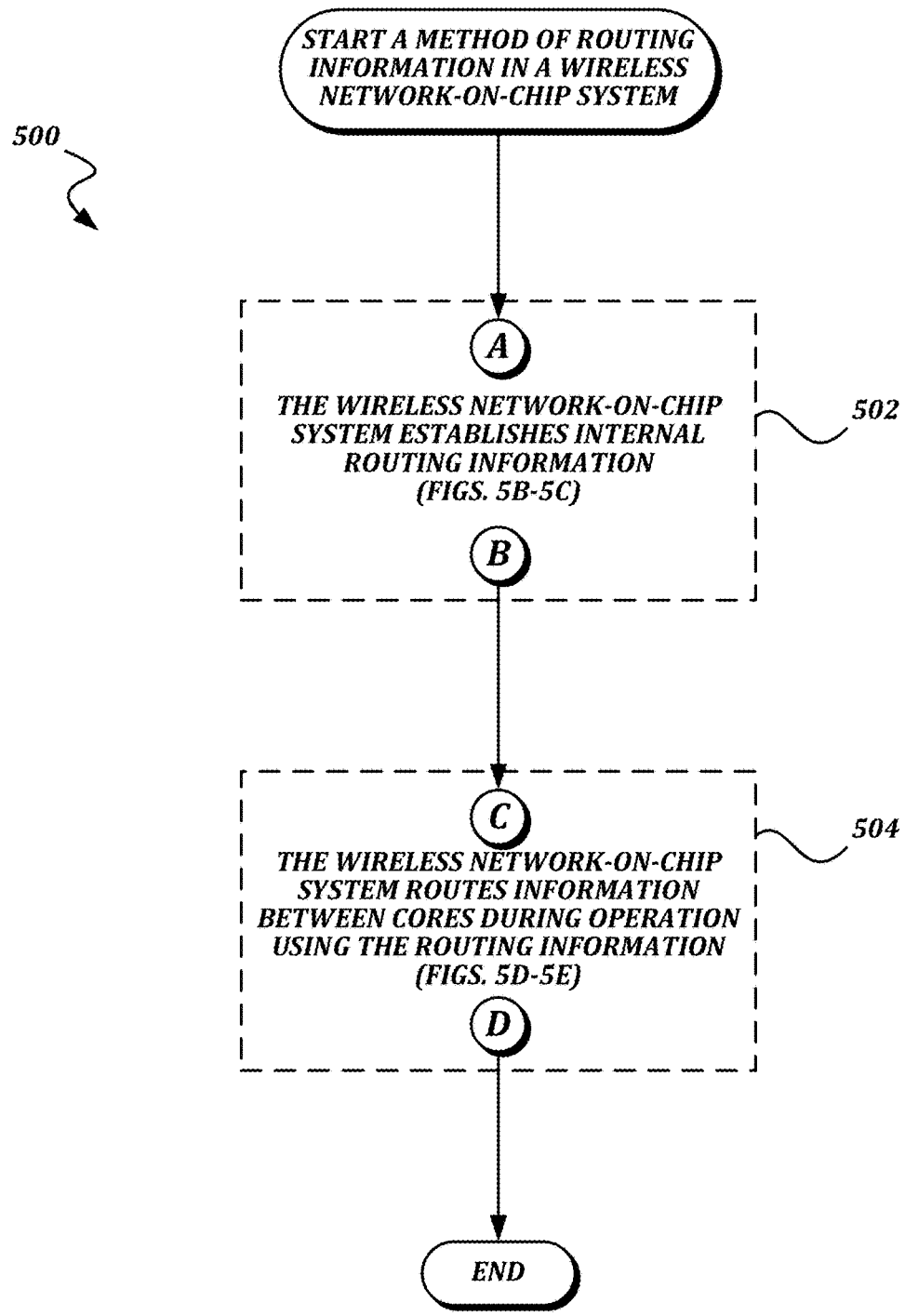
FIGS. 5A-5E are a flowchart that illustrates an exemplary embodiment of a method of routing information in a wireless network-on-chip system according to various aspects of the present disclosure.
Figure 5B:
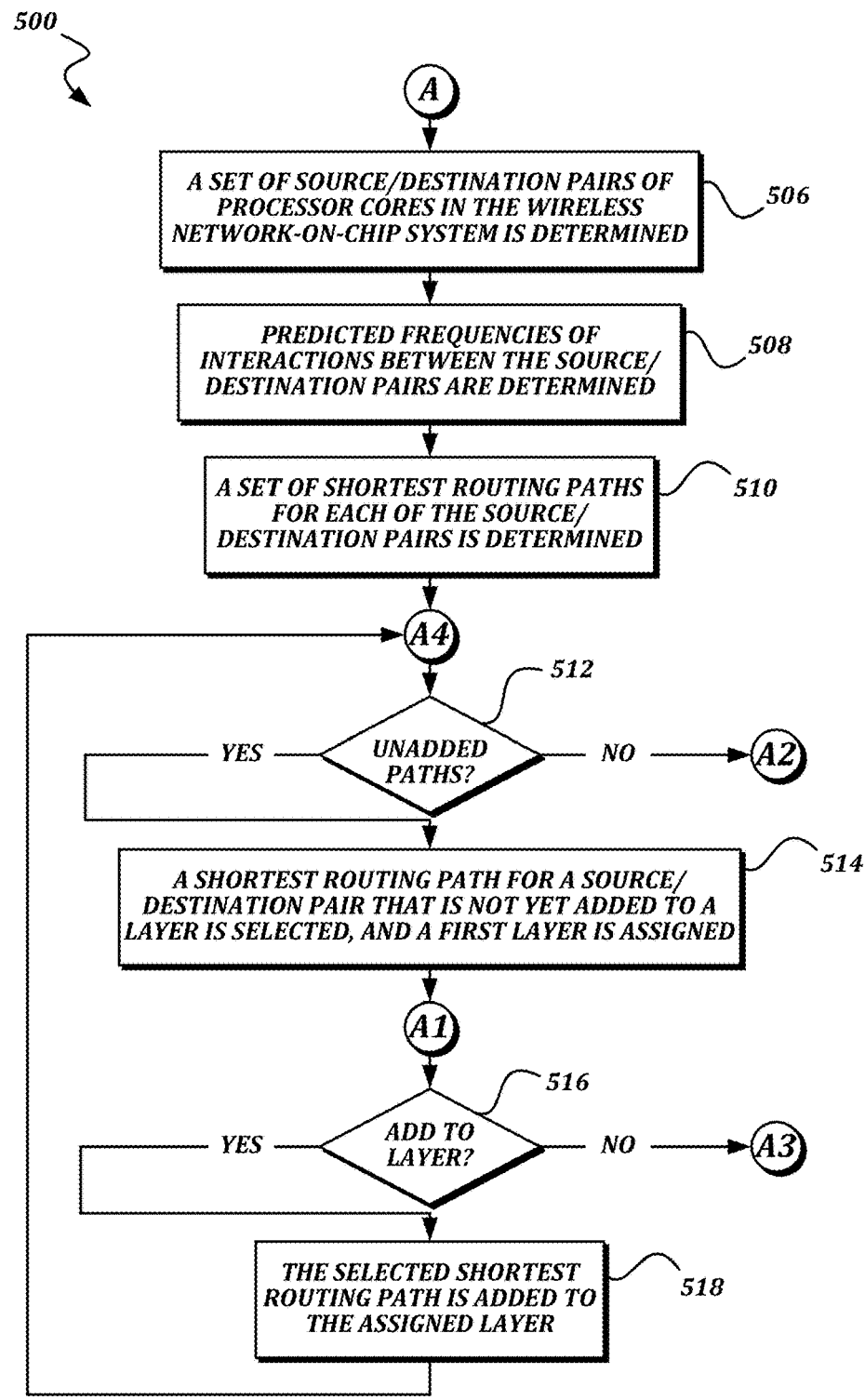
Figure 5C:
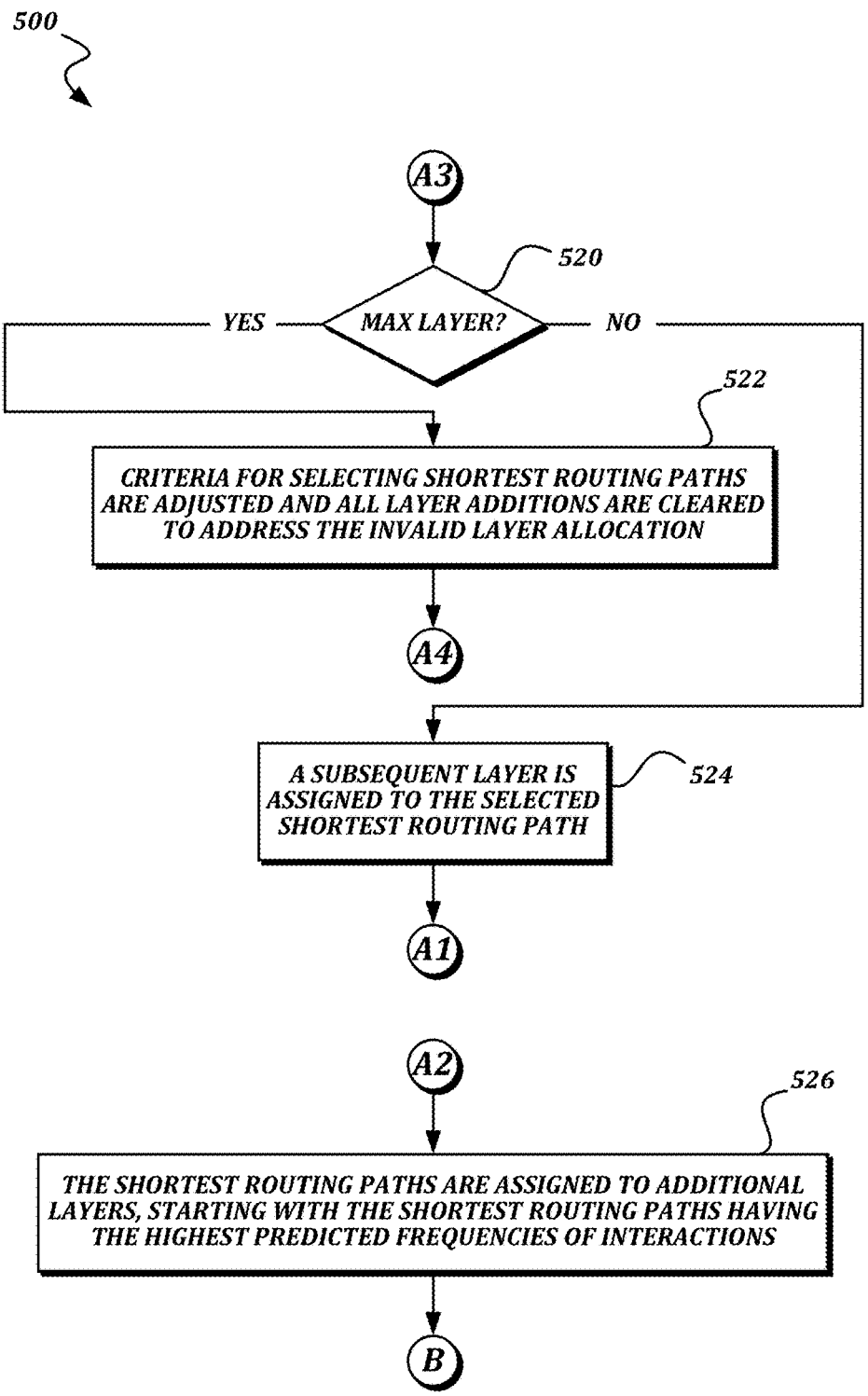
Figure 5D:
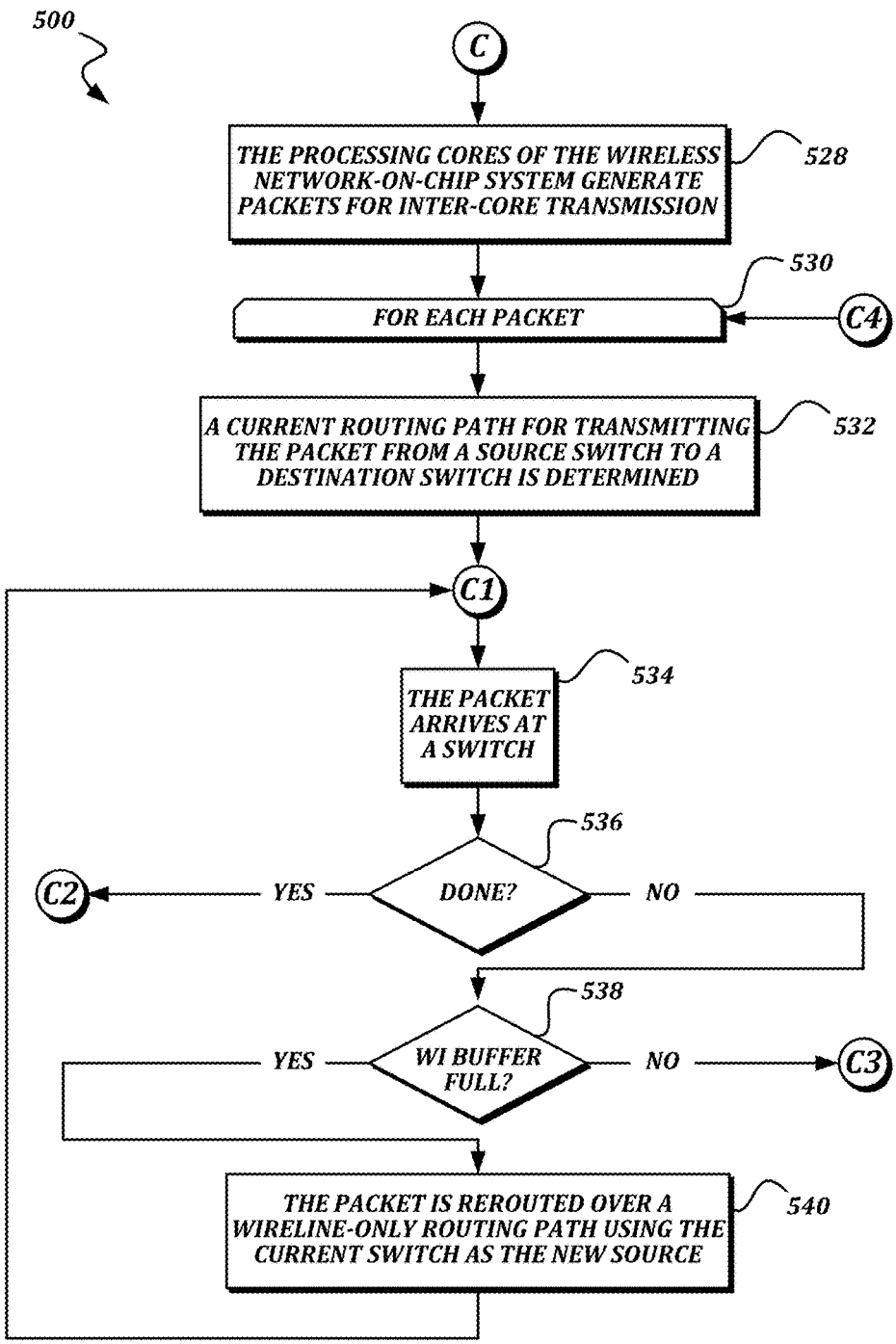
Figure 5E:
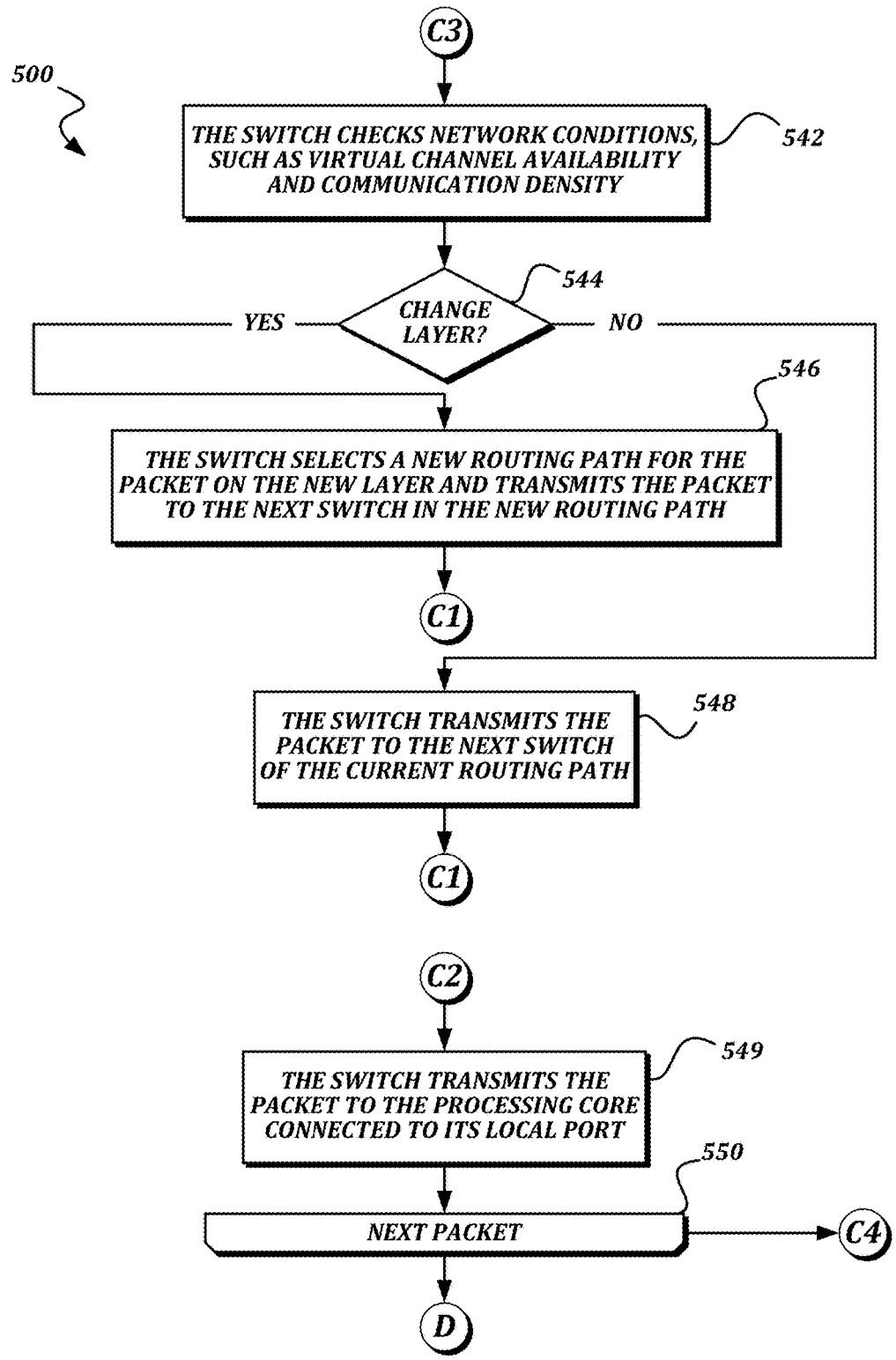

FIG. 4 is a block diagram that illustrates an exemplary embodiment of a non-coherent OOK wireless transceiver according to various aspects of the present disclosure. The design of a low-power wideband wireless transceiver can help provide improved performance for the network-on-chip system 100. Therefore, at both the architecture and circuit levels of the transceiver, low-power design considerations are taken into account. At the architecture level, on-off-keying (OOK) modulation is used to simplify the circuit design. Non-coherent demodulation is used, therefore eliminating the power-hungry phase-lock loop (PLL) in the transceiver. Moreover, at the circuit level, body-enabled design techniques, including both forward body-bias (FBB) with DC voltages, as well as body-driven by AC signals, can be implemented in several sub-blocks to further decrease their power consumption.

As illustrated, the receiver (RX) includes a wideband low-noise amplifier (LNA) 402, an envelope detector 404 for non-coherent demodulation, and a baseband amplifier 406. The low-noise amplifier 402 receives an input signal from an antenna 420. The output of the baseband amplifier 406 is provided to a pulse-shaping filter 408 in order to produce a digital output signal. A voltage-controlled oscillator (VCO) is not needed in the receiver because non-coherent demodulation is used, which results in a power reduction by more than 30% compared to previously used transceivers within network-on-chip systems. The transmitter (TX) has a simple direct up-conversion topology, consisting of a body-driven OOK modulator 414, a wideband power amplifier (PA) 416, and a VCO 412. The OOK modulator 414 receives an input generated by a pulse-shaping filter 410 based on an input digital signal, and the wideband power amplifier 416 outputs a signal to an antenna 418. In some embodiments, the antenna 418 may be the same antenna as antenna 420 with access duplexed between the transmitter and receiver, while in some embodiments, separate antennas may be used. In some embodiments, the components of the transceiver 400 are implemented using hard-wired digital circuits.

In some embodiments, data is transferred within the network-on-chip system 100 via a flit-based, wormhole routing technique. Between a source-destination pair of switches or processing cores, the wireless links, through the WIs, are chosen if the wireless path reduces the total path length compared to the wireline path. This can potentially give rise to hotspot situations in the WIs. Many messages may try to access the wireless shortcuts simultaneously, thus overloading the WIs, which would result in higher latency and energy dissipation. In some embodiments, token flow control is used to alleviate overloading at the WIs. Further description of a token flow control scheme is provided in "Token Flow Control," by A. Kumar et al., in *Proceedings of MICRO,* 2008, pages 342-353, the entire disclosure of which is hereby incorporated by reference in its entirety for all purposes. Tokens are used to communicate the status of the input buffers of a particular WI to the wireline switches, which need to use the WI for accessing the wireless shortcuts.

In some embodiments, an arbitration mechanism is designed to grant access to the wireless medium to a particular WI, including the gateway WI, at a given instant to avoid interference and contention between the WIs that have the same frequency. To avoid the need for centralized control and synchronization, the arbitration policy adopted is a wireless token passing protocol, such as the protocol described in "Design of an Energy Efficient CMOS Compatible NoC Architecture with Millimeter-wave Wireless Interconnects," by S. Deb et al., in *IEEE Transactions on Computers,* 2013, pages 2382-2396, the entire disclosure of which is hereby incorporated by reference in its entirety for all purposes. It should be noted that the "token" in the wireless token passing protocol is different from the token in the above mentioned token flow control. The wireless token passing protocol here is a media access control (MAC) mechanism to access the wireless channels. According to this scheme, the particular WI possessing the token can broadcast flits into the wireless medium in its respective frequency. A single flit circulates as a token in each frequency channel. All other WIs of the same channel will receive the flits, but only the WI whose address matches the destination address will accept the flit for further processing. The wireless token is released and forwarded to the next WI operating in the same frequency channel after all flits belonging to a message at a particular WI are transmitted.

Packets are rerouted, through an alternate wireline path, if the WI buffers are full or if it does not have the token. As rerouting packets can potentially lead to deadlock, a rerouting strategy such as Dynamic Quick Reconfiguration (DQR) may be used to ensure deadlock freedom. In this situation, the current WI becomes the new source for the packet, which is then forced to take a wireline only path to the final destination, still following the original routing strategy restrictions, as explained further below. DQR is described in further detail in "Topology Agnostic Dynamic Quick Reconfiguration for Large-Scale Interconnection Networks," by F. O. Sem-Jacobsen and O. Lynse, in *Proceedings of CCGrid,* 2012, pages 228-235, the entire disclosure of which is hereby incorporated by reference for all purposes.

FIGS. 5A-5E are a flowchart that illustrates an exemplary embodiment of a method of routing information in a wireless network-on-chip system according to various aspects of the present disclosure. From a start block, the method 500 proceeds to a set of method steps 502 defined between an entry terminal ("terminal A") and an exit terminal ("terminal B"), wherein the wireless network-on-chip system establishes internal routing information. In some embodiments, the internal routing information may be established upon system startup, and the static routing information is stored in the routing engine 208 of each switch 200. In some embodiments, the internal routing information may be established repeatedly at run-time, such as during the processing of each packet at block 532 as discussed below.

From terminal A (FIG. 5B), the method 500 proceeds to block 506, where a set of source/destination pairs of processor cores in the wireless network-on-chip system 100 is determined. In some embodiments, the set of source/destination pairs of processor cores may include all possible source/destination combinations. In some embodiments, the set of source/destination pairs may include only processor cores that are designed to or known to communicate with each other. The description of the method 500 refers to source and destination processing cores, but in some instances may instead refer to a source switch or destination switch. Because each switch is communicatively coupled to a processing core via its local port 210, these terms may for the most part be used interchangeably.

At block 508, predicted frequencies of interactions between the source/destination pairs are determined. In some embodiments, the network-on-chip system 100 may measure interactions between cores during actual or simulated execution to determine the predicted frequencies. In such case, a default routing scheme may be used for the simulation or execution. In some embodiments, the predicted frequencies of interactions may be determined by a designer of the network-on-chip system 100. At block 510, a set of shortest routing paths for each of the source/destination pairs is determined. In order to increase the adaptability of the routing, multiple shortest paths between each of the source/destination pairs may be determined, if more than one shortest path exists for a given source/destination pair.

The method 500 then proceeds to a continuation terminal ("terminal A4") which indicates the beginning of a loop in which each of the shortest routing paths is added to a virtual layer. From terminal A4, the method 500 proceeds to a decision block 512, where a determination is made regarding whether there are any shortest routing paths that have not yet been added to a virtual layer. In some embodiments, this determination may instead be made on a source/destination pair basis (instead of on a shortest routing path basis), and may instead determine whether there is a source/destination pair that does not yet have at least one shortest routing pair added to a virtual layer. If the determination at decision block 512 indicates that all of the shortest routing paths have been added to at least one virtual layer, then the result of the decision block 512 is NO, and the method 500 proceeds to a continuation terminal ("terminal A2"). Otherwise, if the determination at decision block 512 is that there is a shortest routing path that has not yet been added to a virtual layer, then the result of the decision block 512 is YES, and the method 500 proceeds to block 514.

At block 514, a shortest routing path for a source/destination pair that is not yet added to a virtual layer is selected, and a first virtual layer is assigned to the selected shortest routing path. When "assigned," the selected shortest routing path is temporarily associated with the assigned virtual layer for further deadlock analysis.

Because the addition of shortest routing paths to a virtual layer will affect which other shortest routing paths could also be added to the virtual layer, the order in which shortest routing paths are selected for addition to virtual layers will affect the performance of the network-on-chip system 100. In some embodiments, the shortest routing path may be selected using a layering technique. In some embodiments, a randomized uniform layering technique may be used, wherein a shortest routing path is selected from the unassigned shortest routing paths at random, giving each shortest routing path an equal opportunity for each virtual layer unless including a path on a virtual layer results in a cyclic dependency. In some embodiments, a layer balancing technique may be used, wherein the predicted frequencies of interactions are used in order to evenly distribute shortest routing paths with large frequencies across the different virtual layers.

In some embodiments, a priority-based layering technique may be used, wherein as many virtual layers as possible are allocated to high-frequency shortest routing paths to improve the adaptability of messages over high-frequency shortest routing paths by providing them with greater routing flexibility. In some embodiments, the high-frequency shortest routing paths selected in the priority-based layering technique by selecting a shortest routing path that has not been added to a layer, that has the highest frequency of the other unadded shortest routing paths, and that also as a frequency that is greater than a threshold frequency, until all such paths have been processed. After all of the shortest routing paths with frequencies greater than the threshold are added to virtual layers, the shortest routing paths with frequencies lower than the threshold may be selected randomly. The remainder of the method 500 proceeds according to this priority-based layering technique.

The method 500 proceeds to a continuation terminal ("terminal A1"), and then to a decision block 516, where a determination is made regarding whether the selected shortest routing path can be added to the assigned virtual layer. The selected shortest routing path can be added to the assigned virtual layer when it would not introduce a susceptibility to deadlocks. In order to achieve deadlock freedom, the network is divided into a set of virtual layers, which are created by dedicating the virtual channels from each switch port into these layers. The shortest routing paths are then assigned to layers such that the layer's channel dependency graph remains free from cycles. A channel dependency is created between two links in the shortest routing path when a link from switch i to switch j and a link from switch j to switch k satisfies the following condition: pathlength(i)<pathlength(j)<pathlength(k), where pathlength(X) is the length of the minimal path between switch X and the original source switch. When a virtual layer's channel dependency graph has no cycles, it is free from deadlocks. Accordingly, in some embodiments, determining whether the selected shortest routing path can be added to the assigned virtual layer includes verifying that these conditions are satisfied.

If the determination indicates that the selected shortest routing path can be added to the assigned virtual layer, then the result of the decision block 516 is YES, and the method 500 proceeds to block 518, where the selected shortest routing path is added to the assigned virtual layer. In some embodiments, adding the selected shortest routing path to the assigned virtual layer includes adding an entry associating the selected shortest routing path with the assigned virtual layer to a look-up table stored by the routing engines 208 of the switches 200. The method 500 then returns to terminal A4 to check for more shortest routing paths that have not yet been added to a virtual layer. Otherwise, if the selected shortest routing path cannot be added to the assigned virtual layer, then the result of the decision block 516 is NO, and the method 500 proceeds to a continuation terminal ("terminal A3").

If the selected shortest routing path could not be added to the assigned virtual layer, then the method 500 attempts to add the selected shortest routing path to other virtual layers until all virtual layers have been tried. Accordingly, from terminal A3 (FIG. 5C), the method 500 proceeds to a decision block 520, where a determination is made regarding whether the assigned virtual layer is the maximum virtual layer. In some embodiments, the virtual layers may be assigned integer values starting at 0, and the virtual layer identifier may be increased up to a maximum virtual layer identifier value associated with the maximum virtual layer.

If the determination indicates that the assigned virtual layer is the maximum virtual layer, then the result of the decision block 520 is YES, and the method 500 proceeds to block 522, where criteria for selecting shortest routing paths are adjusted and all layer additions are cleared to address the invalid layer allocation. If the method 500 arrives at block 522, it indicates that there is a shortest routing path that cannot be added to a virtual layer based on the current layer allocation, and so the network would be unusable. Clearing the virtual layers and starting over with different criteria should allow the shortest routing paths to be allocated in different combinations to address the deadlock issues. In some embodiments, adjusting the criteria may include increasing the threshold that denotes high-frequency shortest routing paths. From block 522, the method 500 returns to terminal A4 to re-add the shortest routing paths using the new criteria.

Otherwise, if the determination at block 520 indicates that the assigned virtual layer is not the maximum virtual layer, then the result of the decision block 520 is NO, and the method 500 proceeds to block 524, where a subsequent virtual layer is assigned to the selected shortest routing path. In some embodiments, where the virtual layers are assigned integer identifiers, the virtual layer identifier may be incremented to select the subsequent virtual layer. From block 524, the method 500 returns to terminal A1 to determine whether the selected shortest routing path can be added to the subsequent virtual layer.

As stated above, after the loop has been executed and there are no longer any shortest routing paths that have not been added to at least one virtual layer, the method 500 proceeds from decision block 512 (FIG. 5B) to terminal A2. From terminal A2 (FIG. 5C), the method 500 proceeds to block 526, where the shortest routing paths are assigned to additional virtual layers, starting with the shortest routing paths having the highest predicted frequencies of interactions. In some embodiments, the shortest routing paths may be sorted by frequency, and may be added to as many additional virtual layers for which there are no deadlocks as possible before moving on to the next shortest routing path in the sorted order. The method 500 then proceeds to the exit terminal ("terminal B").

From terminal B (FIG. 5A), the method 500 proceeds to a set of method steps 504 defined between an entry terminal ("terminal C") and an exit terminal ("terminal D"), wherein the wireless network-on-chip system 100 routes information between cores during operation using the routing information. From terminal C (FIG. 5D), the method 500 proceeds to block 528, where the processing cores of the wireless network-on-chip system 100 generate packets for inter-core transmission. Methods and reasons for the generation of information to be transmitted between the processing cores are known to those of ordinary skill in the art, and so are not described further herein.

The method 500 then proceeds to a for loop defined between a for loop start block 530 and a for loop end block 550 (FIG. 5E), wherein each packet of information to be transmitted between cores is processed. The term "packet" is used in the following description for ease of discussion. In some embodiments, wormhole routing is used, wherein a packet is transmitted as a series of flits. A routing path for the series of flits is established while transmitting a header flit, and is used until a tail flit is sent along the routing path. In such embodiments, the header flit is routed as described below for the packet.

From the for loop start block 530, the method 500 proceeds to block 532, where a current routing path for transmitting the packet from a source switch to a destination switch is determined. In some embodiments, the current routing path is determined by selecting one of the shortest routing paths from the source switch to the destination switch using any suitable technique including but not limited to selecting a shortest routing path with the least traffic, selecting a random shortest routing path, selecting shortest routing paths in a round-robin manner, and/or the like. In some embodiments, determining the current routing path for transmitting the packet includes at least some of the set of method steps 502 described above.

The method 500 then proceeds to a continuation terminal ("terminal C1") that indicates the start of a loop that executes for each switch traversed by the packet to move the packet along a path to the destination switch. From terminal C1, the method 500 proceeds to block 534, where the packet arrives at a switch. The packet arrives via a virtual channel, which is associated with a virtual layer. For the first switch in the routing path, the packet may be assigned to a virtual channel and virtual layer based on a selected routing path.

The method 500 then proceeds to a decision block 536, where a determination is made regarding whether the packet has arrived at the ultimate destination switch to which the packet is addressed. If so, then the result of the decision block 536 is YES, and the method 500 proceeds to a continuation terminal ("terminal C2"). Otherwise, if the packet has not arrived at its ultimate destination switch but instead has arrived at an intermediate switch, then the result of the decision block 536 is NO, and the method 500 proceeds to decision block 538.

At decision block 538, a determination is made regarding whether a wireless interface buffer of the switch is full. This determination is performed if the switch includes a wireless interface, and if the next step in the current routing path is to transmit the packet via the wireless interface. If the next step in the current routing path is via the wireless interface of the switch and the wireless interface buffer is full, then the result of the decision block 538 is YES, and the method 500 proceeds to block 540, where the packet is rerouted over a wireline-only routing path using the current switch as the new source. In some embodiments, a rerouting strategy such as DQR may be used to ensure deadlock freedom over the wireline-only routing path. In some embodiments, the packet may be updated with a flag indicating that it is only to be transmitted via wireline connections, in order to ensure that the wireline-only connections are used by subsequent switches. The method 500 then transmits the packet to the next switch in the wireline-only routing path and returns to terminal C1.

Otherwise, if the switch does not include a wireless interface, if the next step in the current routing path is via a wireline connection instead of the wireless interface, or if the wireless interface buffer is not full, then the result of the decision block 538 is NO, and the method 500 proceeds to a continuation terminal ("terminal C3"). From terminal C3 (FIG. 5E), the method 500 proceeds to block 542, where the switch checks network conditions for the current routing path. In some embodiments, checking network conditions may include checking virtual channel availability. As the current routing path includes a virtual layer associated with a virtual channel to be used to transmit the packet to the next switch, checking virtual channel availability at a current switch may include determining whether a buffer associated with the associated virtual channel includes enough free space to accept the packet, or whether another virtual channel would be preferable by virtue of having a greater amount of free buffer space. In some embodiments, checking network conditions may include checking communication density. In such embodiments, the routing engine 208 may track a number of packets sent over a given virtual channel or physical channel over a given time period, and may decide that another virtual channel or physical channel would be preferable when the number of packets is greater than a given threshold or accounts for more than a given percentage of traffic through the switch.

The method 500 then proceeds to a decision block 544, where a determination is made whether or not to change the virtual layer for the packet based on the network conditions. As discussed above, the routing engine 208 may determine that the virtual layer should be changed if the associated virtual channel does not have enough buffer space, or if the virtual channel or physical port accounts for too much of the proportion of traffic across the switch 200. Otherwise, the routing engine 208 may determine that the virtual layer should not be changed. If the result of the determination at decision block 544 is that the virtual layer should be changed, then the result of decision block 544 is YES, and the method 500 proceeds to block 546, where the switch selects a new routing path for the packet on the new virtual layer and transmits the packet to the next switch in the new routing path via a virtual channel associated with the new virtual layer. In some embodiments, the selected new routing path is one of the shortest routing paths with the switch as the source and the original destination as the destination. If, at block 440, a WI buffer was previously full and the packet has been rerouted over a wireline-only routing path, then the selected new routing path will be a shortest routing path that only uses wireline connections. In some embodiments, the selection of the new routing path excludes routing paths on virtual layers that have already been visited by the packet, to avoid deadlocks. In some such embodiments, layer history information may be stored in the packet. The method 500 then returns to terminal C1 to process the packet at the next switch. Otherwise, if the result of the determination at decision block 544 is that the virtual layer should not be changed, then the result of decision block 544 is NO, and the method 500 proceeds to block 548, where the switch transmits the packet to the next switch of the current routing path. The method 500 then returns to terminal C1 to process the packet at the next switch.

As discussed above, if the packet was determined to have arrived at the ultimate destination switch at decision block 536, then the method 500 proceeded to terminal C2. From terminal C2, the method 500 proceeds to block 549, where the switch transmits the packet to the processing core connected to its local port, and then to the for loop end block 550, where it returns to the for loop start block 530 via a continuation terminal ("terminal C4").

One of ordinary skill in the art will recognize that although the actions of a single switch were described in isolation in the set of method steps 504 for ease of discussion, some embodiments have multiple instances of the for loop executing concurrently, and have instances of the for loop executing on each of the switches in the wireless network-on-chip system 100. One of ordinary skill in the art will also recognize that the for loop may continue as long as the processing cores continue to operate and transmit data. Once the processing cores stop execution and stop transmitting data (such as upon powering down), the method 500 proceeds to terminal D, and from terminal D (FIG. 5A) to an end block, where it terminates.

In some embodiments, routing techniques other than the ALASH technique described above may be used. For example, in some embodiments an up/down tree-based routing algorithm belonging to the rule-based classification, such as the MROOTS routing technique may be used. MROOTS allows multiple routing trees to exist, where each tree routes on a dedicated virtual channel. Hence, traffic bottlenecks can be reduced in the upper tree levels that are inherent in this type of routing. Multiple tree root selection policies may be used, such as a random root placement (random), a maximized intra-root tree distance placement (max distance), and a traffic-weighted minimized hop-count placement ($f_{ij}$). The random root placement chooses the roots at random locations. The maximized intra-root tree distance placement attempts to find roots that are far apart in the tree, in order to minimize the congestion near the selected roots. Finally, the traffic-weighted minimized hop-count placement is described as follows. Selecting M tree roots will create M trees in the network, where the chosen M roots minimize the optimization metric μ as defined in the following equation.

$$\mu = \min\nolimits_{\forall roots} \Sigma_{\forall i} \Sigma_{\forall j} h_{ij} f_{ij}$$

Here, the minimum path distance in hops, $h_{ij}$, from switch i to switch j is determined following the up/down routing restrictions. The frequency of traffic interaction between the switches is denoted by $f_{ij}$. As root selection only affects valid routing paths for deadlock freedom and does not alter the physical placement of links, any a priori knowledge of the frequency of traffic interaction aids in root selection. Incorporating $f_{ij}$ helps minimize the routed path lengths for specific workloads on the network-on-chip system architecture. Breadth-first trees may be used during the tree creation process to balance the traffic distribution among the subtrees, and to minimize bottlenecks in a particular tree. All wireless and wireline links that are not part of the breadth-first tree are reintroduced as shortcuts. An allowed route never uses an up direction along the tree after it has been in the down path once. In addition, a packet traveling in the downward direction is not allowed to take a shortcut, even if that minimizes the distance to the destination. Hence, channel dependency cycles are prohibited, and deadlock freedom is achieved.

The performance and temperature profiles of the network-on-chip system illustrated and described herein were experimentally analyzed, and were shown to be superior to existing techniques. GEM5, a full system simulator, was used to obtain detailed processor- and network-level information. A system of 64 alpha processor cores running Linux within the GEM5 platform was used for all experiments. Three SPLASH-2 benchmarks, FFT, RADIX, and LU; and seven PARSEC benchmarks, CANNEAL, BODYTRACK, VIPS, DEDUP, SWAPTION, FLUIDANIMATE, and FREQMINE, were considered. These benchmarks vary in characteristics from computation intensive to communication intensive in nature and thus are of particular interest.

Figure 6:
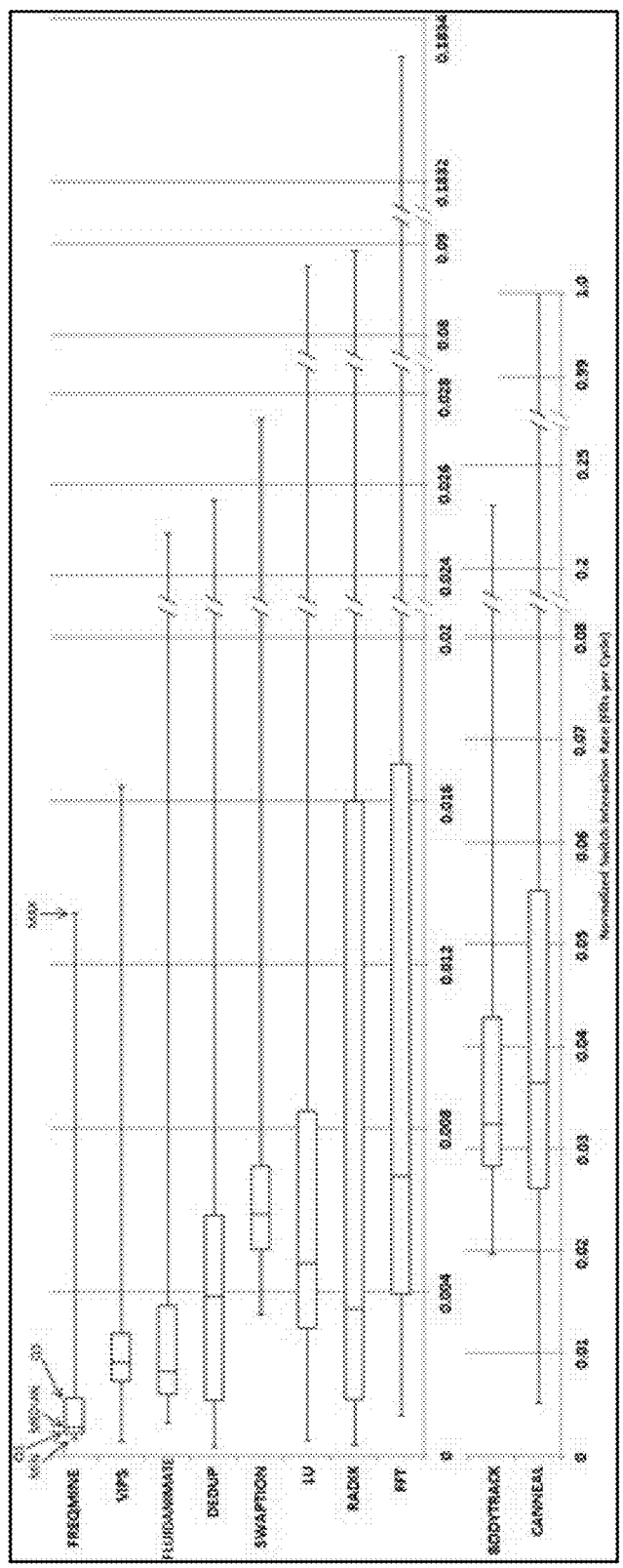
FIG. 6 is a chart that illustrates inter-switch traffic patterns in terms of normalized switch interaction rates for simulated benchmarks executed by exemplary embodiments of the present disclosure.

The inter-switch traffic patterns in terms of normalized switch interaction rates for the above-mentioned benchmarks are shown in FIG. 6. The benchmarks that are computation intensive, FFT, RADIX, LU, SWAPTION, DEDUP, FLUIDANIMATE, VIPS, and FREQMINE, have low median switch interaction rates. Conversely, the benchmarks that are communication intensive, CANNEAL and BODYTRACK, have higher median switch interaction rates than the others. It can be seen in FIG. 6 that the medians of the interaction rate for these two benchmarks are higher than the medians of the other benchmarks. The median switch interaction rates of the other benchmarks are low, but are not exactly the same. As an example, FFT has a relatively high median switch interaction rate when compared to the other computation intensive benchmarks, but when compared to the communication intensive benchmarks, it is an order of magnitude lower. The switch interaction rate of these benchmarks plays an important role in the overall latency, energy dissipation, and thermal profiles of the network-on-chip system, as explained later.

The width of all wired links in the simulated example system is considered to be the same as the flit width, which is 32 bits. Each packet consists of 64 flits. The simulator uses switches synthesized from an RTL level design using TSMC 65-nm CMOS process in Synopsys™ Design Vision. All ports except those associated with the WIs have a buffer depth of two flits and each switch port has four virtual channels. Hence, four trees and four layers are created in MROOTS and ALASH, respectively. The ports associated with the WIs have an increased buffer depth of eight flits to avoid excessive latency penalties while waiting for the token. Increasing the buffer depth beyond this limit does not produce any further performance improvement for this particular packet size, but will give rise to additional area overhead. Energy dissipation of the network switches, inclusive of the routing strategies, were obtained from the synthesized netlist by running Synopsys™ Prime Power, while the energy dissipated by wireline links was obtained through HSPICE simulations, taking into consideration the length of the wireline links. The processor-level statistics generated by the GEM5 simulations are incorporated into McPAT (Multicore Power, Area, and Timing) to determine the processor-level power values.

After obtaining the processor and network power values, these elements are arranged on a 20 mm×20 mm die. The floorplans, along with the power values, are used in HotSpot to obtain steady state thermal profiles. The processor power and the architecture-dependent network power values in presence of the specific benchmarks are fed to the HotSpot simulator to obtain their temperature profiles.

The wireless transceiver circuitry was designed and laid out using TSMC 65-nm standard CMOS process and its characteristics were obtained through post-layout simulation using Agilent ADS Momentum and Cadence Spectre as well as measurements using a Cascade on-wafer probing station. The overall power consumption of the transceiver is 31.1 mW based on post-layout simulation, including 14.2 mW from the RX and 16.9 mW from the TX. With a data rate of 16 Gbps, the equivalent bit energy is 1.95 pJ/bit. The total area overhead per wireless transceiver, which includes all of the components within the transceiver box 400 illustrated in FIG. 4, turns out to be 0.17 mm². Both the energy and area have been reduced compared to previous network-on-chip system designs, mainly due to the non-coherent RX topology which eliminates the VCO.

Figure 7A:
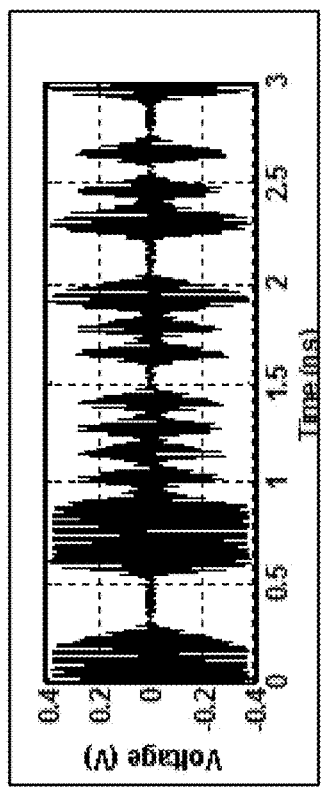
FIGS. 7A-7C are charts that illustrate time-domain waveforms of a simulation of an exemplary embodiment of the present disclosure at the transmitter output and receiver after demodulation.
Figure 7B:
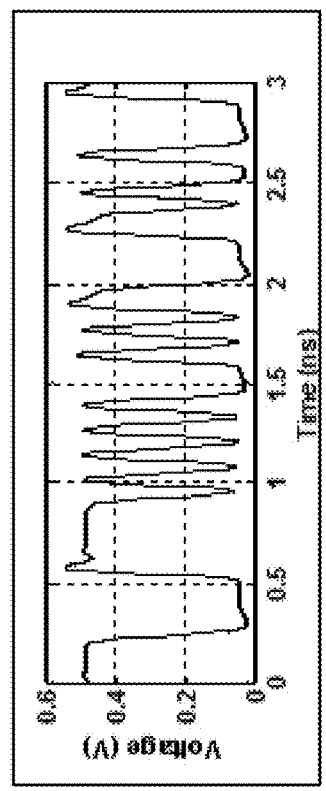
Figure 7C:
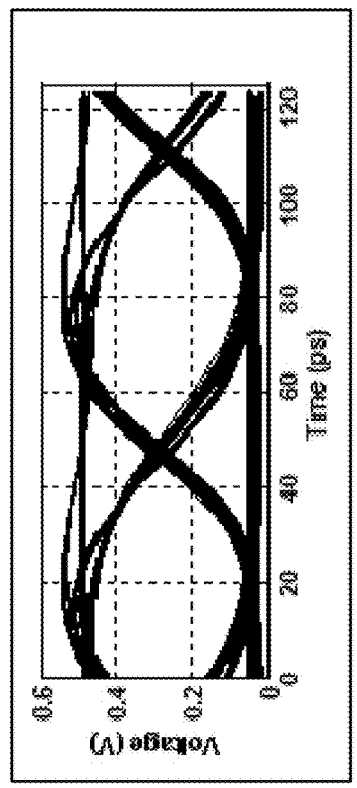

FIGS. 7A-7C illustrate the simulated time-domain waveform at the TX output and RX after demodulation. The waveform is an OOK-modulated signal with a 60 GHz carrier frequency and 16 Gbps baseband data rate. As shown in FIG. 7A, the peak voltage amplitude reached is 300 mV even at the shortest pulse, which is equivalent to having 0 dBm on a 50-Ohm antenna load. The modulated signal was then fed into the RX after passing through a simulated channel and antenna model. FIG. 7B shows the demodulated signal at the RX baseband amplifier output, and it can be seen that the signal matches the transmitted baseband data. Also, shown in FIG. 7C, the eye in the eye diagram of the demodulated signal is wide open indicating the signal has decent quality after demodulation. With such RX and TX front-ends, the OOK target data rate of 16-Gbps (or higher) can be achieved.

As discussed above, the placement of the roots for MROOTS-based routing and the layering function for ALASH-based routing can affect the performance of the network-on-chip system architecture. FIGS. 8A and 8B show the simulated variation of the energy-delay product with respect to the location of the roots for MROOTS and the layering function for ALASH for the various benchmarks considered. It can be seen in FIG. 8A that for the MROOTS routing, traffic-weighted minimized hop-count placement ($f_{ij}$) obtains the minimum energy-delay product. This is due to the fact that the highest communicating switches are placed at the roots, effectively allowing for shortest path routing to be employed for these switches. Hence, the $f_{ij}$ root selection strategy is used for MROOTS for the other performance evaluations described below.

It can be seen in FIG. 8B that the priority layering function obtains the minimum energy-delay product and improves the energy-delay product over our initial uniform layering for ALASH routing. This is due to the fact that the highest communicating source-destination pairs are given the most resources, allowing the adaptability in ALASH to work at its best. Hence, the priority layering function is used for ALASH for the other performance evaluations described below.

Figure 9:
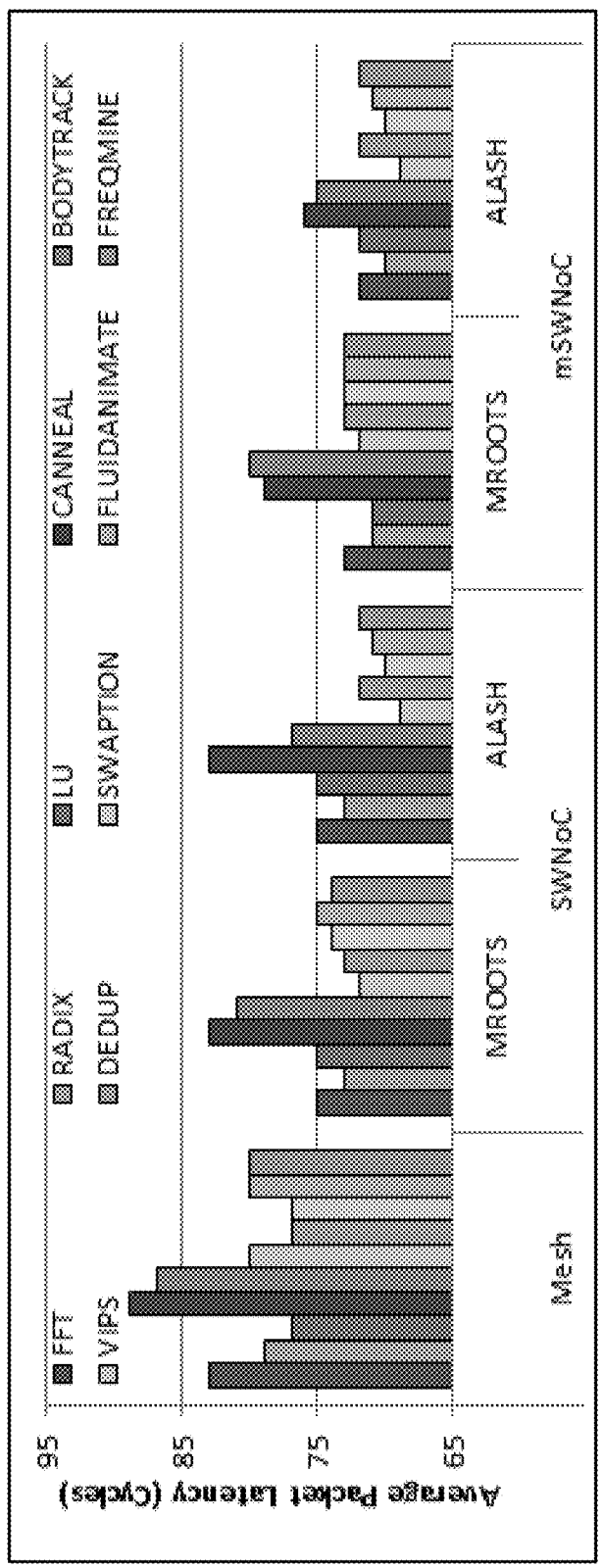
FIG. 9 is a chart that illustrates average network packet latency for various simulated architectures discussed in the present disclosure using different routing strategies and for various benchmarks.

FIG. 9 shows the average network packet latency for the various architectures using the two different routing strategies and considering the above-mentioned benchmarks. It can be observed from FIG. 9 that for all the benchmarks considered here, the latency of the millimeter-wave small-world network-on-chip system (mSWNoC) described above is lower than that of the mesh and wireline small-world network-on-chip (SWNoC) architectures. This is due to the small-world, network-based interconnect infrastructure of the mSWNoC with direct long-range wireless links that enables a smaller average hop-count than that of mesh and SWNoC.

Both the MROOTS and ALASH routing strategies are implemented on the same millimeter-wave small-world network-on-chip system architecture. The difference in latency arises due to the routing-dependent traffic distribution of the benchmarks. However, it should be noted that the difference in latency among the routing algorithms on the same architecture is small due to the fact that the traffic injection load for all these benchmarks is low and the network operates much below saturation.

It can be seen in FIG. 9 that ALASH has lower latency compared to MROOTS for the benchmarks considered. MROOTS includes a strong tendency to generate traffic hotspots near the roots of the spanning trees. These traffic hotspots cause messages to be delayed in the network due to root congestion. Since ALASH does not have a tree-based routing strategy, ALASH does not have this root congestion problem. ALASH also attempts to provide the shortest physical path between any source and destination. On the other hand, MROOTS makes no guarantees about the message path length. Moreover, the priority-based layering function described above helps ALASH also. Due to all these reasons, ALASH routing in the network-on-chip system out performs MROOTS in average packet latency.

Figure 10:
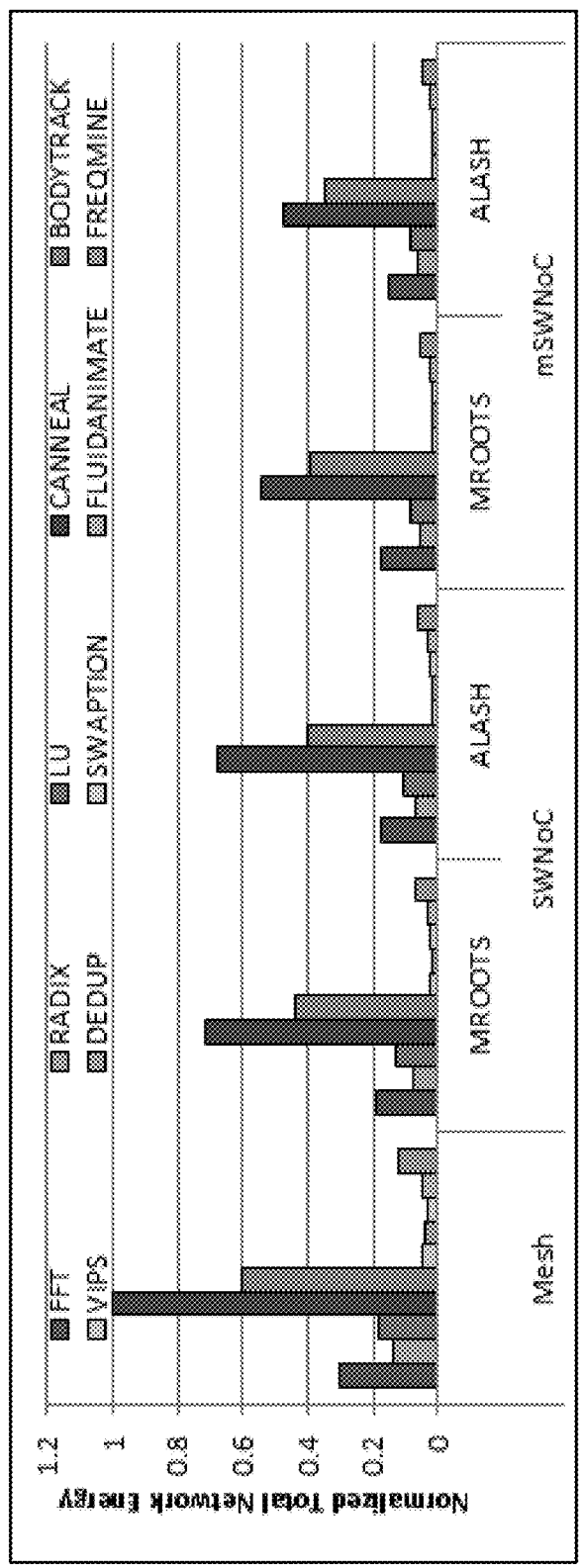
FIG. 10 is a chart that illustrates the total normalized network energy dissipation for various simulated architectures discussed in the present disclosure.

FIG. 10 shows the total normalized network energy dissipation for the mSWNoC, SWNoC, and mesh architectures. The total network energy dissipation is considered to compare the characteristics of the network-on-chip architectures and their associated routing strategies under consideration here. It can be observed from FIG. 10 that for each benchmark the network energy is lower for the SWNoC and mSWNoC compared to the mesh architecture. Though the gain in latency for SWNoC/mSWNoC compared to the mesh is low due to the relatively lower injection loads, the improvement in energy dissipation brings forward the benefit of small-world architectures more clearly. The two main contributors of the energy dissipation are from the switches and the interconnect infrastructure. In the SWNoC/mSWNoC, the overall switch energy decreases significantly compared to a mesh as a result of the better connectivity of the architecture. In this case, the hop-count decreases significantly, and hence, on the average, packets have to traverse through a fewer number of switches and links. In addition, a significant amount of traffic traverses through energy efficient wireless channels in mSWNoC as described above, consequently allowing the interconnect energy dissipation to be further decreased compared to the SWNoC architecture. It can also be observed from FIG. 10 that the energy dissipation for the two different routing strategies follows the same trend as that of the latency. When messages are in the network longer (higher latency) they dissipate more energy. The difference in energy dissipation arising out of the logic circuits of each individual routing is very small and the overall energy dissipation is principally governed by the network characteristics.

Figures 11, 12A, 12B:
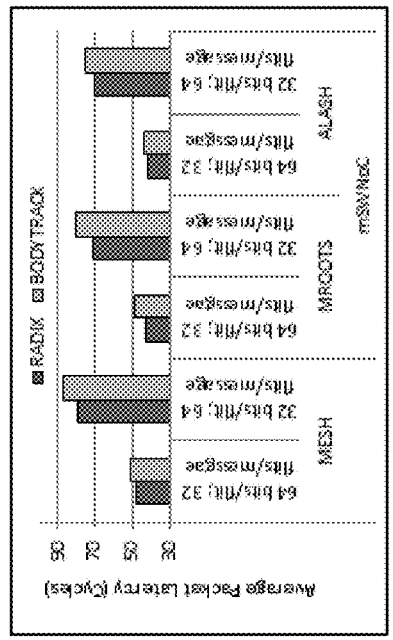
FIG. 11 is a chart that illustrates contributions of the energy dissipation for different parts of a simulated exemplary embodiment of a wireless network-on-chip architecture and a mesh architecture for the FFT benchmark.
FIGS. 12A and 12B are charts that illustrate average packet latency and energy dissipation characteristics, respectively, for simulated exemplary embodiments of the present disclosure for different packet length and flit size messages.

Without loss of generality, FIG. 11 highlights the contributions of the energy dissipation for the different components of the mSWNoC and mesh architecture for the FFT benchmark. The contributors to the mesh energy are the network switches and the wireline links. The contributions to the mSWNoC energy arise from the network switches, the wireline links, and the wireless links which also include the energy of the antennas and the transceivers.

The average packet latency and network energy dissipation with different sized packets and flit lengths were also considered. Two different scenarios were analyzed: one packet size has 64 flits per packet with 32 bits per flit and the other packet size has 32 flits per packet with 64 bits per flit. The latency and normalized energy dissipation profile of the mSWNoC were compared with respect to the mesh by varying the message characteristics as mentioned above. For brevity, we show these characteristics for two benchmarks, one with a low switch interaction rate, like RADIX, and another with relatively higher switch interaction rate, like BODYTRACK. FIG. 12A shows the average packet latency of the different packet length and flit size messages. It can be seen in FIG. 12A that although the absolute value varies for average packet latency, both ALASH and MROOTS maintain the latency improvement over mesh irrespective of the packet length or flit size. FIG. 12B shows the energy dissipation characteristics for these two packet and flit sizes. It is clear that similar to the latency characteristics, mSWNoC is always more energy efficient than the mesh.

The thermal profile of the mSWNoC, SWNoC and mesh architectures were also analyzed. To quantify the thermal profile of the SWNoC/mSWNoC in presence of the two routing strategies, the temperatures of the network switches and links were monitored. It was also ensured that each network element carried sufficient traffic to contribute to the overall thermal profile.

The maximum and average switch and link temperature changes between a mesh and SWNoC/mSWNoC, $\Delta T_{hotspot}$ and $\Delta T_{avg}$ respectively were used as the two relevant parameters. As explained above, the benchmarks can be put into two different categories: communication and computation intensive. BODYTRACK and RADIX are two representative examples for the communication and computation intensive benchmarks, respectively. The other benchmarks performed according to the same trend, but are not discussed or illustrated herein for the sake of brevity.

Figure 13A:
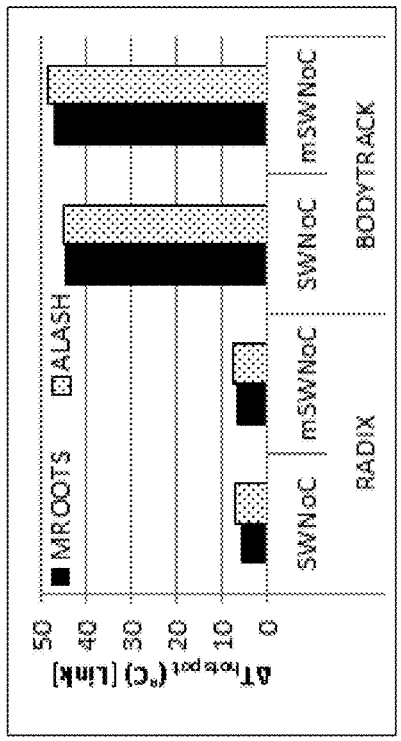
FIGS. 13A, 13B, 14A, and 14B are charts that illustrate temperature reductions for links and switches in simulated embodiments of different routing strategies according to various aspects of the present disclosure.
Figure 13B:
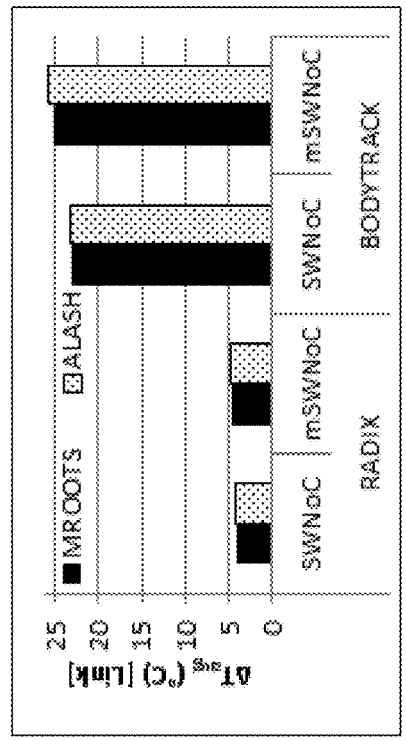

FIGS. 13A, 13B, 14A, and 14B show $\Delta T_{hotspot}$ and $\Delta T_{avg}$ for the links and switches of the two routing strategies. It can be seen that the SWNoC/mSWNoC network architectures are inherently much cooler than the mesh counterpart. From FIG. 10 one can see that the difference in energy dissipation between the small world architectures and mesh is significant and hence, it is natural that SWNoC/mSWNoC switches and links are cooler as well. FIG. 13A helps depict how well each routing strategy performs in distributing the power density, and hence heat, among the network switches, and FIG. 13B depicts similar information with respect to links. This is due to the fact that variations in $\Delta T_{hotspot}$ correspond to how well the routing mechanism balances the traffic within the network. The more interesting observation while analyzing the temperature profile lies in characterizing the differences among the routing strategies for the small-world architectures. ALASH performs well in distributing the traffic among the network elements. Because of this, ALASH has the lowest maximum network temperature, which can be seen in FIGS. 13A and 13B, where ALASH has the largest $\Delta T_{hotspot}$.

Figure 14A:
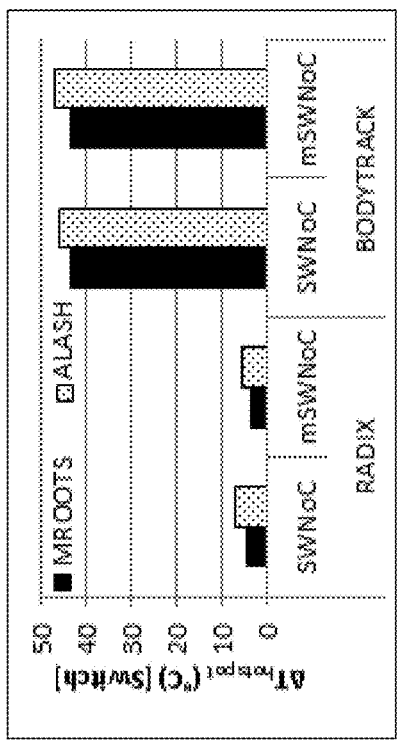
Figure 14B:
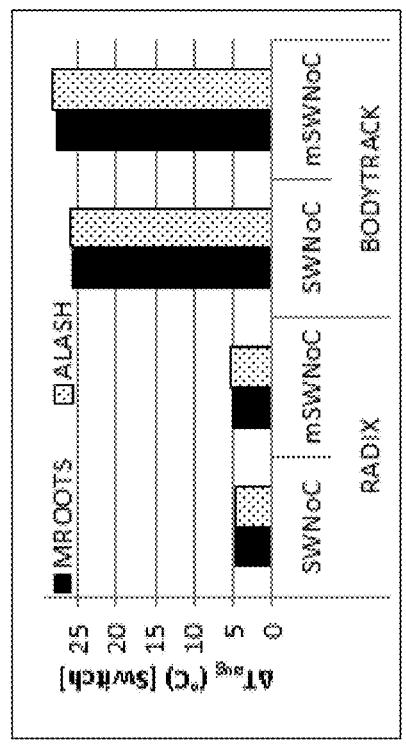

By observing FIGS. 14A and 14B, it can also be seen that the average temperature reduction in switches and links among the routing strategies is relatively unaffected. One can conclude from this that reduction of the maximum temperature using ALASH has not come at the cost of increasing the average network temperature due to the inherent rerouting efforts of this strategy. Overall, it can be seen that for the routing strategies implemented, one can obtain very similar latency and network energy profiles while reducing the temperature of the hotspot switches and links.

Figure 15A:
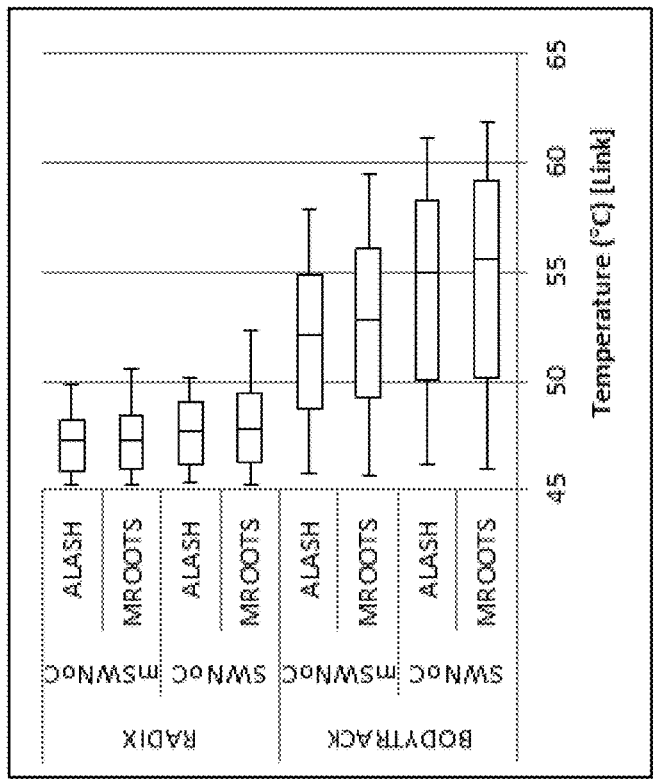
FIGS. 15A and 15B are charts that illustrate temperature distribution of switches and links, respectively, for simulations of exemplary embodiments of routing schemes according to various aspects of the present disclosure while executing the RADIX and BODYTRACK benchmarks.

FIG. 15A displays the temperature distribution of the switches in the routing schemes of the RADIX and BODYTRACK benchmarks. Here, it can be seen that the MROOTS routing strategy has a larger temperature spread compared to ALASH for both of the small-world architectures (the difference between the first and third quartiles is larger). The MROOTS routing strategy will form bottlenecks in the upper levels of its trees. In this case, the heat distribution will be spread further as the leaves among the trees see lighter traffic, while the near-root nodes see heavier traffic. ALASH attempts to avoid creating hotspots by having multiple shortest paths. By choosing a path that avoids local network hotspots, one can reduce the maximum network temperature quite well using the ALASH routing strategy. For RADIX and BODYTRACK, ALASH reduces the hotspot switch temperature further compared to MROOTS by 1.86° C. and 3.32° C. on mSWNoC, respectively.

Between the SWNoC and mSWNoC architectures, the SWNoC achieves a higher switch hotspot temperature reduction for the computation intensive benchmarks, as their traffic density is small. This can be seen in FIG. 15A as SWNoC has a lower maximum temperature over mSWNoC for both routing strategies for the RADIX benchmark. For these benchmarks, the benefits of the wireless shortcuts are outweighed by the amount of traffic that the WIs attract. However, for the communication intensive benchmarks with higher traffic density, the use of high-bandwidth wireless shortcuts in the mSWNoC quickly relieves the higher amount of traffic that the WIs attract. In case of SWNoC, as the shortcuts are implemented through multi-hop wireline links, moving traffic through these wireline links takes more time and energy which correlates with less temperature reduction. This can be seen in FIG. 15A as SWNoC has a higher maximum temperature over mSWNoC for both routing strategies for the BODYTRACK benchmark. Conversely, between SWNoC and mSWNoC, the mSWNoC achieves a higher link hotspot temperature reduction. This is due to the wireless links detouring significant amounts of traffic away from the wireline links.

Figure 15B:
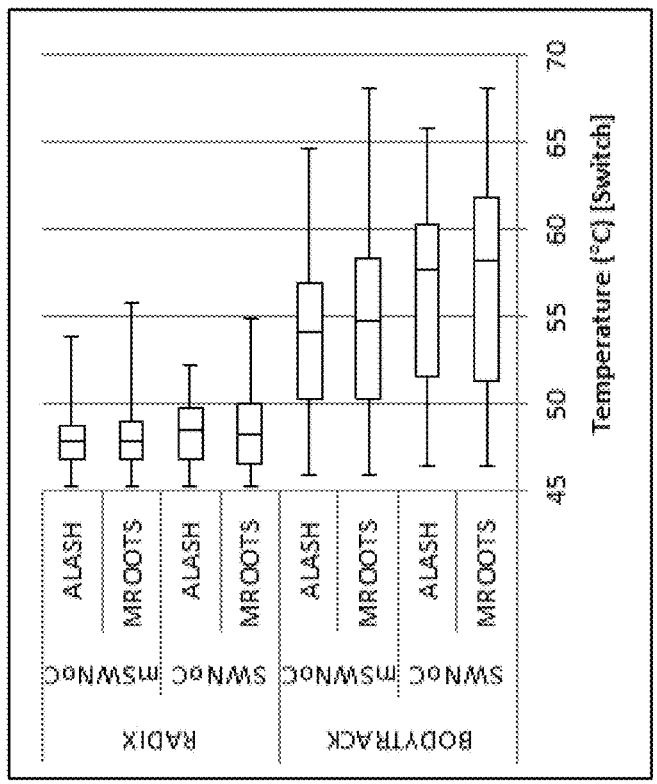

FIG. 15B displays the temperature distribution of the links in the routing schemes of the RADIX and BODYTRACK benchmarks. The links follow the same temperature trend as the switches where the MROOTS routing strategy has a larger temperature spread when compared to ALASH for both of the small-world architectures (the difference between first and third quartiles is larger). For RADIX and BODYTRACK, ALASH reduces the hotspot link temperature further compared to MROOTS by 0.92° C. and 1.69° C. on mSWNoC, respectively.

Figure 16:
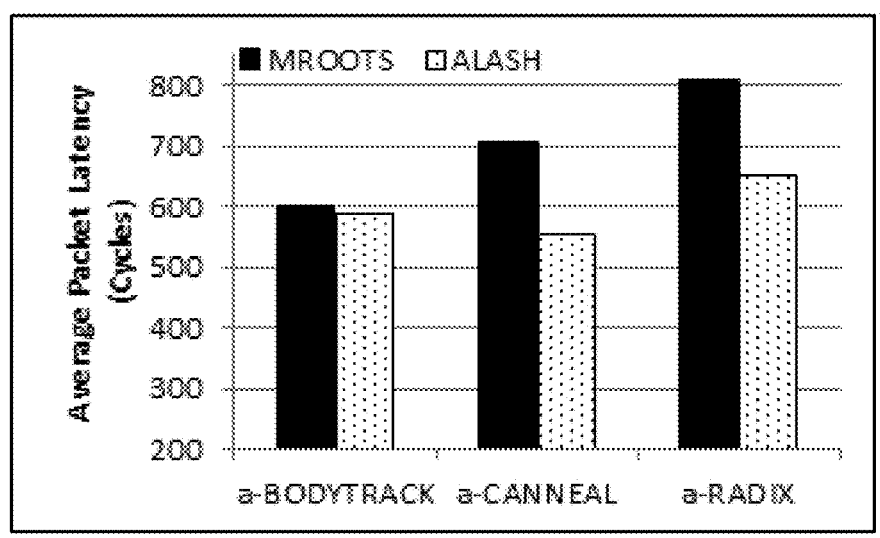
FIG. 16 illustrates saturation latency of a simulated exemplary embodiment of the present disclosure using the MROOTS and ALASH routing strategies in the midst of artificially inflated traffic patterns.

As mentioned above, the benchmarks considered in the previous simulations operate below network saturation. To have a detailed comparative performance evaluation of MROOTS and ALASH, reviewing the effects of these routing strategies when the network is in saturation would also be beneficial. Accordingly, simulations were performed wherein the switch interaction rates were artificially inflated for the BODYTRACK, CANNEAL, and RADIX benchmarks (a-BODYTRACK, a-CANNEAL, and a-RADIX respectively). FIG. 16 shows the saturation latency of the MROOTS and ALASH routing strategies using these artificially inflated traffic patterns for mSWNoC. It can be seen from FIG. 16 that ALASH performs better than MROOTS. This is due to the inherent problem of any tree-based routing, where the roots of the spanning trees become traffic bottlenecks. As mentioned above, when the traffic injection rates are high enough, the root switches start to become traffic hotspots. Hence, the messages get delayed in the network due to root congestion. ALASH does not have a root congestion problem, and hence out performs MROOTS because of the adaptiveness in ALASH. It should be noted that after artificially inflating the computation-intensive benchmark loads, like RADIX, they become more communication-intensive. Hence, ALASH out performs MROOTS in case of a-RADIX.

While illustrative embodiments have been illustrated and described, it will be appreciated that various changes can be made therein without departing from the spirit and scope of the invention.

The embodiments of the invention in which an exclusive property or privilege is claimed are defined as follows:

1. An integrated circuit, comprising:
 a plurality of processing cores; and
 a plurality of switches connected to the plurality of processing cores;
 wherein at least two switches of the plurality of switches include non-coherent on-off keying (OOK) wireless transceivers for establishing a wireless communication link between the at least two switches; and
 wherein each of the non-coherent OOK wireless transceivers comprises a receiver having a wideband low-noise amplifier, an envelope detector for non-coherent demodulation, and a baseband amplifier.

2. The integrated circuit of claim 1, wherein the receiver does not include a local oscillator.

3. The integrated circuit of claim 1, wherein each of the non-coherent OOK wireless transceivers comprises a transmitter having an OOK modulator, a voltage-controlled oscillator, and a wideband power amplifier.

4. The integrated circuit of claim 1, wherein each of the non-coherent OOK wireless transceivers is coupled to a zig-zag antenna.

5. The integrated circuit of claim 1, wherein at least two switches of the plurality of switches are communicatively coupled via wireline connections.

6. The integrated circuit of claim 5, wherein the wireless communication link and wireline connections between the switches of the plurality of switches form a network having small-world properties.

7. The integrated circuit of claim 6, wherein information is routed within the network using an adaptive layered shortest path routing (ALASH) technique.

\* \* \* \* \*